United States Patent
Inui et al.

(10) Patent No.: US 8,908,037 B2
(45) Date of Patent: Dec. 9, 2014

(54) CALIBRATION DEVICE, METHOD, AND PROGRAM FOR ON-BOARD CAMERA

(75) Inventors: Yoji Inui, Ama-gun (JP); Kazutaka Hayakawa, Anjo (JP)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 590 days.

(21) Appl. No.: 13/256,822

(22) PCT Filed: Mar. 19, 2010

(86) PCT No.: PCT/JP2010/054765
§ 371 (c)(1),
(2), (4) Date: Sep. 15, 2011

(87) PCT Pub. No.: WO2010/113673
PCT Pub. Date: Oct. 7, 2010

(65) Prior Publication Data
US 2012/0007985 A1    Jan. 12, 2012

(30) Foreign Application Priority Data
Mar. 31, 2009 (JP) ................... 2009-085537

(51) Int. Cl.
*H04N 7/18* (2006.01)
*H04N 17/00* (2006.01)
*G06T 7/00* (2006.01)

(52) U.S. Cl.
CPC ............ *H04N 17/002* (2013.01); *G06T 7/0018* (2013.01); *G06T 2207/30204* (2013.01); *G06T 2207/30264* (2013.01)
USPC .......................................................... 348/148

(58) Field of Classification Search
CPC ........... G06T 2207/30204; G06T 2207/30264; G06T 7/0018
See application file for complete search history.

(56) References Cited

U.S. PATENT DOCUMENTS 6,813,371 B2 * 11/2004 Kakinami .................. 382/104
2004/0017370 A1    1/2004 Azemoto et al.
(Continued)

FOREIGN PATENT DOCUMENTS

CN    101226638 A    7/2008
CN    101236655 A    8/2008
(Continued)

OTHER PUBLICATIONS

Japanese Office Action dated Jan. 10, 2013 issued in Japanese Application No. 2010-262348.
(Continued)

*Primary Examiner* — Dave Czekaj
*Assistant Examiner* — Md Haque
(74) *Attorney, Agent, or Firm* — Sughrue Mion, PLLC

(57) ABSTRACT

An on-board camera calibration device with high productivity is provided which allows speedy calibration of the on-board camera with high precision with a simple construction. Based on an actual coordinate specified in a projecting plane of a camera coordinate system and a converted coordinate obtained by converting an initial coordinate of a calibration point with using unfixed camera adjustment values, the adjustment values corresponding to angles of rotation about one or two axes from among three axes of the camera coordinate system are calculated and the camera adjustment values are updated. Based on the actual coordinate and the converted coordinate in accordance with the updated camera adjustment values, the adjustment values corresponding to angles of rotation about the remaining axes of the camera coordinate system is calculated and the camera adjustment values are updated. When the predetermined completion condition is satisfied, the updated camera adjustment values are fixed.

4 Claims, 12 Drawing Sheets

(56) References Cited

U.S. PATENT DOCUMENTS

| | | |
|---|---|---|
| 2005/0179801 A1 | 8/2005 | Miwa et al. |
| 2008/0031514 A1 | 2/2008 | Kakinami |
| 2008/0181488 A1 | 7/2008 | Ishii et al. |
| 2008/0186384 A1 | 8/2008 | Ishii et al. |

FOREIGN PATENT DOCUMENTS

| | | | |
|---|---|---|---|
| EP | 1 498 689 A1 | | 1/2005 |
| EP | 1 954 063 A2 | | 8/2008 |
| JP | 2001-245326 A | | 9/2001 |
| JP | 2003141527 | | 5/2003 |
| JP | 2005-077107 A | | 3/2005 |
| JP | 2006-148745 A | | 6/2006 |
| JP | 2006-306162 A | | 11/2006 |
| JP | 2008/131177 | * | 6/2008 |
| JP | 2008-131177 A | | 6/2008 |
| JP | 2008-131250 A | | 6/2008 |
| JP | 2008-187564 A | | 8/2008 |
| JP | 2008-193188 A | | 8/2008 |

OTHER PUBLICATIONS

International Search Report PCT/JP2010/054765, Jun. 29, 2010.
Extended European Search Report, dated May 7, 2013, issued in corresponding European Patent Application No. 10758447.6.
D. Oberkampf et al., "Iterative Pose Estimation Using Coplanar Feature Points," Computer Vision and Image Understanding, Academic Press, May 1, 1996, pp. 495-511, vol. 63, No. 3, US.
Z. Zhang, 'Flexible Camera Calibration by Viewing a Plane From Unknown Orientations, Computer Vision, 1999, The Proceedings of the Seventh IEEE International Conference on Kerkyra, Greece, Sep. 20-27, 1999, 1 Sep. 20, 1999, pp. 666-673, vol. 1. IEEE Comput. Soc, Los Alamitos, CA, USA.
English Translation of International Preliminary Report on Patentability for PCT/JP2010/054765 dated Nov. 24, 2011.
Chinese Office Action issued Jun. 27, 2013 in Chinese Patent Application No. 201080012666.9.

* cited by examiner (A)    (B)

(A)    (B)

(A)    (B)

Fig.22
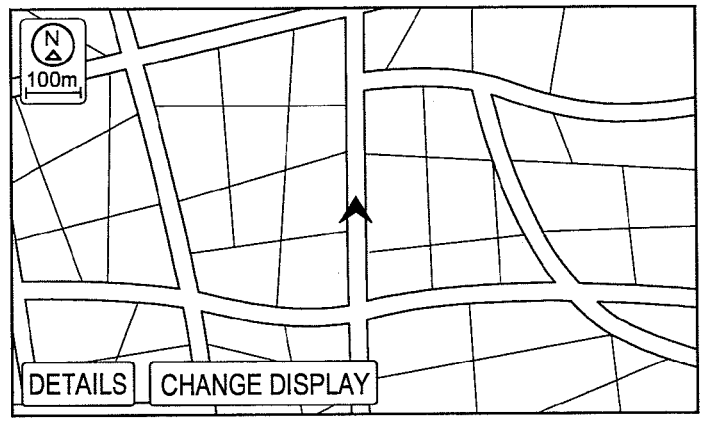
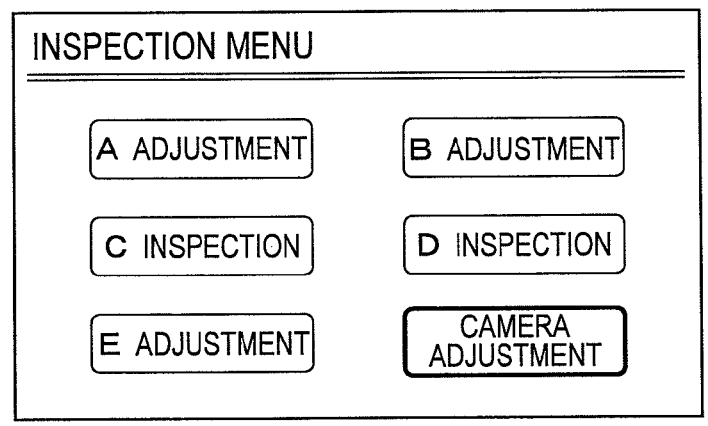
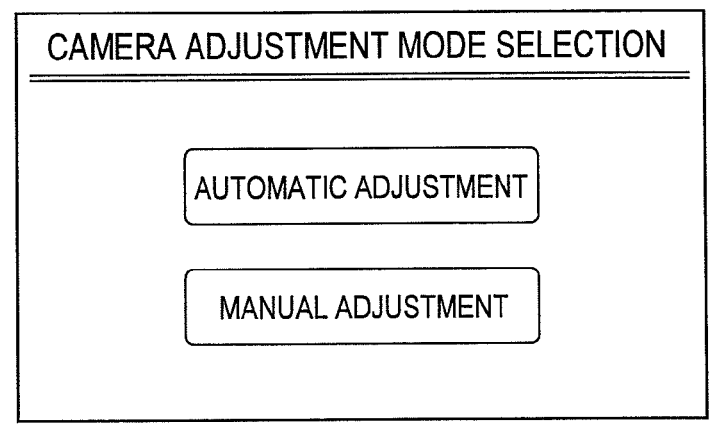

CALIBRATION DEVICE, METHOD, AND PROGRAM FOR ON-BOARD CAMERA

CROSS REFERENCE TO RELATED APPLICATIONS

This application is a National Stage of International Application No. PCT/JP2010/054765 filed Mar. 19, 2010, claiming priority based on Japanese Patent Application No. 2009-085537 filed Mar. 31, 2009, the contents of all of which are incorporated herein by reference in their entirety.

TECHNICAL FIELD

The present invention relates to a calibration device for an on-board camera, which calibrates the on-board camera by adjusting a mounting error when mounted on the vehicle.

BACKGROUND ART

Recently, for the purpose of supplementing a driver's vision and/or providing input information for use in image processing for driving assistance, an on-board camera is often mounted on a vehicle for capturing a visual scene around the vehicle. If an image captured by the camera is to be utilized e.g. for a parking assistance device, it is needed that the coordinate system of the image captured by the camera and the coordinate system of the image used in the image processing match with high precision each other. As a matter of fact, the designed ideal correlation therebetween can hardly be obtained due to error or tolerance in the manufacturing precision of the camera per se and/or in the mounting precision of the camera. Accordingly, calibration of the camera has been done during the production step of the vehicle, so as to achieve matching between the two coordinate systems.

U.S. Pat. No. 6,813,371B (Patent Document 1) and JP2005-77107A1 (Patent Document 2) disclose a technique for effecting such calibration of the camera during the production process of the vehicle. According to the technique disclosed by these documents, the calibration of the camera is done through a worker's operation of an adjustment button, by causing a calibration index captured by the camera to agree on a display screen with an adjustment frame displayed in superposition with a captured image, under a predetermined criterion. As the adjustment frame, there are provided three kinds, in correspondence with roll, tilt and pan in the three-dimensional, orthogonal coordinate system. In operation, a worker will operate the adjustment button so as to place the calibration index within these adjustment frames one after another, whereby camera parameters are changed. Upon completion of all adjustments relative to the three axes of the coordinate system, the changed camera parameters are stored in a memory.

The above-described technique disclosed by Patent Document 1 and Patent Document 2 is advantageous in allowing camera calibration with the relatively simple construction. However, the worker needs to effect adjustments relative to the three axes corresponding to rotational directions of the camera by manually operating the adjustment button, while continuously viewing a display screen. So, the calibration takes a long time and the calibration precision tends to be unstable, depending on the skill/experience of each individual worker. So, there is the possibility of a product with insufficient calibration being forwarded inadvertently to the subsequent production process. Then, as shown in JP2008-131177A1 (Patent Document 3) and JP2008-131250A1 (Patent Document 4), there have been proposed a further technique that obtains camera parameters (projection parameters) through calculation of rotation matrices of the camera. According to the technique, a first matrix is calculated based on coordinates in a reference coordinate system of a calibration point set at a designed position in the reference coordinates. And, a second matrix is calculated based on coordinates in an image coordinate system of the calibration point specified from the captured image of the camera. Further, based on the first matrix and the second matrix, a rotation matrix (third matrix) of the camera is calculated.

CITATION LIST

Patent Literature

Patent Document 1: U.S. Pat. No. 6,813,371 (see, for example, column 5, lines 43-67, column 8, line 56—column 10, line 23 and FIG. 6)
Patent Document 2: Japanese Unexamined Patent Application Publication No. 2005-77107 (see, for example, paragraphs 43-63)
Patent Document 3: Japanese Unexamined Patent Application Publication No. 2008-131177 (see, for example, paragraphs 60-102)
Patent Document 4: Japanese Unexamined Patent Application Publication No. 2008-131250 (see, for example, paragraphs 54-96)

SUMMARY OF INVENTION

The technique disclosed by Patent Document 3 and Patent Document 4 is superior in that the ideal camera calibration is made possible by the calculation of camera rotation matrix, without relying on the "worker's visual alignment" which is the case with Patent Document 1 and Patent Document 2. However, in actual production sites, various error causes exist, and thus frequently, errors are caused in the obtained rotation matrix. In this case, visual deviation will be caused after the calibration. Therefore, as described in paragraph 106 of Patent Document 3, there is provided a success/failure determining step for determining whether or not the calibration is successful. In the success/failure determining step, when it is determined that the calibration is not successful, it is necessary to perform calibration again, and as a result, the productivity is lowered. If the number of the calibration indices is increased and the detailed calculation is performed, the accuracy of the rotation matrix may become high, but the number of production facilities, as well as calculation time, is increased, and thus the increase in the indices is not preferred.

Therefore, it has been demanded to provide an on-board camera calibration device with high productivity, which device allows speedy calibration of the on-board camera with high precision with a simple construction. Likewise, it has been demanded to provide a calibration method for an on-board camera and a calibration program for an on-board camera for causing a computer to execute a calibration function for the on-board camera.

In one aspect of the calibration device for an on-board camera according to the present invention in view of the above, there is provided a calibration device for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for calibrating the on-board camera, the device including:

an image acquiring section for acquiring a captured image captured by the on-board camera with including, within a field of view, calibration indices disposed at two different predetermined positions in the reference coordinate system;

a calibration point specifying section for detecting a calibration point in each of the calibration indices in the captured image which is a projecting plane of the camera coordinate system and for specifying as an actual coordinate a coordinate of the calibration point in a two-dimensional orthogonal coordinate system set in the projecting plane;

a camera posture setting section for setting an initial coordinate that specifies each calibration point in the projecting plane when the on-board camera is mounted at the designed position in the designed posture, based on camera parameters defining the relationship between the camera coordinate system and the reference coordinate system;

an initialization calculation section for initializing camera adjustment values for correcting the camera parameters in accordance with the actual mounting posture of the on-board camera, the camera adjustment values corresponding to displacement amounts from the designed posture and having three adjustment values corresponding to rotation angles about respective three coordinate axes of the camera coordinate system;

a coordinate conversion section for converting the initial coordinate into a converted coordinate with using the camera adjustment values which are yet unfixed;

a first adjusting section for calculating one or two adjustment values from among the adjustment values constituting the camera adjustment values, based on the converted coordinate and the actual coordinate, and for updating the camera adjustment values;

a second adjusting section for calculating the other adjustment values than the one or two adjustment values calculated in the first adjusting section from among the adjustment values constituting the camera adjustment values, based on the actual coordinate and the converted coordinate which has been coordinate-converted by the coordinate conversion section with using the camera adjustment values updated by the first adjusting section, and for updating the camera adjustment values;

an adjustment completion determining section for determining completion of an adjustment of the camera adjustment values when displacement amounts between the converted coordinate and the actual coordinate during the adjustment by the first adjusting section and the second adjusting section are less than respective predetermined reference displacement amounts; and a camera adjustment value setting section for fixing the camera adjustment values updated with using the adjustment values calculated in the first adjusting section and the second adjusting section, based on a determination result of the completion of the adjustment by the adjustment completion determining section.

An error in the three-dimensional camera coordinate system should be adjusted with using the two-dimensional captured image. By adjusting the error in two steps with using the first adjusting section and the second adjusting section, the calibration device for an camera can be configured with a simple construction. The camera adjustment values are updated with using the adjustment result by the first adjusting section, and then the adjustment is performed by the second adjusting section while utilizing the converted coordinate which has been coordinate-converted with using the camera adjustment values obtained above. Therefore, the first adjusting section and the second adjusting section perform the adjustment of the camera adjustment values in a predetermined order. However, when any one of three axes of the three-dimensional camera coordinate system is adjusted based on the calibration point detected in the two-dimensional captured image, there is a possibility that this adjustment has an influence on the result of the adjustments effected on the other axes. Accordingly, while taking this influence into consideration, the axes of the camera coordinate system to be adjusted are set in each of the first adjusting section and the second adjusting section. Then, the camera adjustment values are adjusted by the first adjusting section and the second adjusting section which executes the adjustment with using the result of the first adjusting section. Therefore, there is provided an on-board camera calibration device with high productivity, which device allows speedy calibration of the on-board camera with high precision.

In one preferable embodiment of the calibration device for an on-board camera, the adjustment values calculated by the first adjusting section generates a readjustment error by adjustment by the second adjusting section which has been adjusted by the first adjusting section, and the adjustment values calculated by the second adjusting section generates a readjustment error by adjustment by the first adjusting section which has been adjusted by the second adjusting section, and the coordinate axis corresponding to one or two adjustment values adjusted by the first adjusting section is set so that the readjustment error generated in the adjustment values calculated by the first adjusting section becomes smaller than the readjustment error generated in the adjustment value calculated by the second adjusting section.

As described above, when any one of the three axes of the three-dimensional camera coordinate system is adjusted in accordance with the calibration point specified in the two-dimensional coordinate system, there may be a possibility that the adjustment has an influence on the result of the adjustment effected on the other axes. In addition, a magnitude of the influence by the adjustment of one axis on the result of the adjustment effected on the other axes is not the same among three axes. Namely, there is an axis that has, when the adjustment is effected, a relatively significant influence on the adjustment results of the other axes. Since the second adjusting section is executed while the result of the adjustment by the first adjusting section is taken into consideration, when the result of the adjustment by the first adjusting section is significantly affected by the adjustment by the second adjusting section, the adjustment by the first adjusting section becomes useless. Even though the first adjusting section and the second adjusting section execute the adjustments repeatedly, there may be a case where the camera adjustment values will not converged. Therefore, it is preferable that the axis on which the adjustments by the first adjusting section and the second adjusting section are effected be set in such a manner that the influence of the adjustment by the first adjusting section on the result of the adjustment by the second adjusting section becomes relatively significant than the influence of the adjustment by the second adjusting section on the result of the adjustment by the first adjusting section.

In another preferable embodiment of the calibration device for an on-board camera, a straight line connecting two of the actual coordinates in the projecting plane is a real line, a straight line connecting two of the converted coordinate in the projecting plane is a converted straight line, in the camera coordinate system, a straight line connecting an origin of the camera coordinate system and a midpoint between two of the actual coordinates in the projecting plane is a second real line, in the camera coordinate system, a straight line connecting the origin of the camera coordinate system and a midpoint between two of the converted coordinate in the projecting plane is a second converted straight line, the rotation angle of a roll rotation about one axis of the camera coordinate system which is orthogonal to the projecting plane is a roll angle, the rotation angle of a pan rotation about one of axes of the camera coordinate system which are parallel to the projecting plane is a pan angle, the rotation angle of a tilt rotation about the other of the axes of the camera coordinate system which are parallel to the projecting plane is a tilt angle, a displacement amount in the roll rotation from the designed posture which is one of the adjustment values constituting the camera adjustment values is a roll adjustment value, a displacement amount in the pan rotation from the designed posture which is one of the adjustment values constituting the camera adjustment values is a pan adjustment value, and a displacement amount in the tilt rotation from the designed posture which is one of the adjustment values constituting the camera adjustment values is a tilt adjustment value, wherein the first adjusting section calculates an angle between the real line and the converted straight line as a difference value of the roll angle, calculates the roll adjustment value based on the difference value of the roll angle, and updates the camera adjustment values, the second adjusting section calculates an angle between the second real line and the second converted straight line as difference value of at least one of the pan angle and the tilt angle, calculates at least one of the pan adjustment value based on the difference value of the pan angle and the tilt adjustment value based on the difference value of the tilt angle, and updates the camera adjustment values, and the adjustment completion determining section determines the completion of the adjustment of the camera adjustment values when the difference values calculated in the first adjusting section and the second adjusting section are less than respective predetermined completion threshold values.

Deviation relating the rotation of the three-dimensional camera coordinate system can be defined by three rotations about the respective three orthogonal coordinate axes. In addition, the projecting plane orthogonally intersects one of three orthogonal axes of the camera coordinate system, and is in parallel with the other two orthogonal axes of the camera coordinate system. Therefore, the error in one axis of the camera coordinate system which orthogonally intersects the projecting plane can be adjusted through obtaining a rotational amount of the captured image corresponding to the projecting plane. In addition, the error in two axes of the camera coordinate system in parallel with the projecting plane can be adjusted through obtaining an upper/lower and/or right/left shift amount in the captured image corresponding to projecting plane. According to this feature, since the first adjusting section for effecting the adjustment based on the rotational amount and the second adjusting section for effecting the adjustment based on the shift amount are provided, the on-board camera can be appropriately calibrated. In addition, each of the first adjusting section and the second adjusting section executes the adjustment with utilizing an angle between two straight lines. Therefore, the adjustment can be effected with a relatively simple linear calculation and calculation load is alleviated, leading to a simple and cost effective calibration device. In addition, since calculation load is alleviated, the calibration device can execute speedy calibration of the on-board camera. Moreover, when the difference values calculated in the first adjusting section and the second adjusting section become less than the respective predetermined completion threshold values, the camera adjustment values are fixed, and thus the on-board camera can be calibrated with high precision. Incidentally, this arrangement is very effective in a case where the influence by the adjustment of the roll angle on the displacement amounts of the pan angle and the tilt angle is larger than the influence by the adjustment of the pan angle and the tilt angle on the displacement amount of the roll angle.

In still another preferable embodiment of the calibration device for an on-board camera, the second adjusting section includes: a pan adjusting section for calculating as the difference value of the pan angle a component of an angle of one axial direction of the two-dimensional orthogonal coordinate system set in the projecting plane from among the components of the angle between the second real line and the second converted straight line and calculating the pan adjustment value based on the difference value of the pan angle; and a tilt adjusting section for calculating as the difference value of the tilt angle a component of an angle of the other axial direction of the two-dimensional orthogonal coordinate system from among the components of the angle between the second real line and the second converted straight line and calculating the tilt adjustment value based on the difference value of the tilt angle.

As described above, the error in two axes of the camera coordinate system in parallel with projecting plane can be adjusted through obtaining an upper/lower and/or right/left shift amount in the captured image corresponding to projecting plane. Therefore, it is preferable that the second adjusting section include functional sections corresponding to respective axes, so that the adjustment can be effected on each axis accordingly.

In still another preferred embodiment of the calibration device for an on-board camera, the pan adjusting section and the tilt adjusting section perform calculation based on the converted coordinate which has been coordinate-converted by the coordinate conversion section with using the same camera adjustment values as the camera adjustment value after the roll adjustment value is updated by the first adjusting section.

The shift amount in the projecting plane, i.e. positional deviation in the projecting plane can be expressed with the shift amounts in the respective two axial directions in the two-dimensional orthogonal coordinate system. When the shift amounts in the respective two axial directions are expressed by means of vector, the sum of the two vectors is the shift amount in the projecting plane. Since a commutative law is established in vector sum, no problem arises in obtaining the shift amount in any axial direction first, and the result is always the same. It is noted that, since the calibration of the three-dimensional camera coordinate system is performed with using the coordinate value in the two-dimensional projecting plane, strictly speaking, the commutative law cannot be established. However, it is not problematic to suppose that the commutative law is generally established even though some errors may exist. In addition, rather than increasing frequency of a coordinate conversion using different camera adjustment values, calculation load becomes alleviated as a consequence when the entire calculations are repeated several times while taking errors occurring from the difference in the coordinate system into consideration, and calculation time is also expected to be shorter.

In one aspect of the calibration method for an on-board camera according to the present invention in view of the above, there is provided a calibration method for an on-board camera for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for calibrating the on-board camera, the method including steps of:

an image acquiring step for acquiring a captured image captured by the on-board camera with including, within a field of view, calibration indices disposed at two different predetermined positions in the reference coordinate system;

a calibration point specifying step for detecting a calibration point in each of the calibration indices in the captured image which is a projecting plane of the camera coordinate system and for specifying as an actual coordinate a coordinate of the calibration point in a two-dimensional orthogonal coordinate system set in the projecting plane;

a camera posture setting step for setting an initial coordinate that specifies each calibration point in the projecting plane when the on-board camera is mounted at the designed position in the designed posture, based on camera parameters defining the relationship between the camera coordinate system and the reference coordinate system;

an initialization step for initializing camera adjustment values for correcting the camera parameters in accordance with the actual mounting posture of the on-board camera, the camera adjustment values corresponding to displacement amounts from the designed posture and having three adjustment values corresponding to rotation angles about respective three coordinate axes of the camera coordinate system;

a first coordinate conversion step for converting the initial coordinate into a first converted coordinate with using the camera adjustment values which are yet unfixed;

a first adjusting step for calculating one or two adjustment values from among the adjustment values constituting the camera adjustment values, based on the first converted coordinate and the actual coordinate, and for updating the camera adjustment values;

a second coordinate conversion step for converting the initial coordinate into a second converted coordinate with using the camera adjustment values which are updated in the first adjusting step and are yet unfixed;

a second adjusting step for calculating the other adjustment values than the one or two adjustment values calculated in the first adjusting step from among the adjustment values constituting the camera adjustment values, based on the second converted coordinate and the actual coordinate, and for updating the camera adjustment values;

an adjustment completion determining step for determining completion of an adjustment of the camera adjustment values under a completion condition that displacement amounts between the first converted coordinate and the actual coordinate and displacement amounts between the second converted coordinate and the actual coordinate are less than respective predetermined reference displacement amounts in the first adjusting step and the second adjusting step, for repeating the first coordinate conversion step, the first adjusting step, the second coordinate conversion step, and the second adjusting step when the completion condition is not satisfied, and for terminating the repetition of the steps and advancing a process to a next step when the completion condition is satisfied; and a camera adjustment value setting step for fixing the camera adjustment values updated with using the adjustment values calculated in the first adjusting step and the second adjusting step, to which camera adjustment value setting step a process is advanced when the completion condition is satisfied in the adjustment completion determining step.

In one aspect of the calibration program for an on-board camera according to the present invention in view of the above, there is provided a calibration program for an on-board camera for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for causing a computer to execute a function of calibrating the on-board camera, the calibration program including:

an image acquiring function of acquiring a captured image captured by the on-board camera with including, within a field of view, calibration indices disposed at two different predetermined positions in the reference coordinate system;

a calibration point specifying function of detecting a calibration point in each of the calibration indices in the captured image which is a projecting plane of the camera coordinate system and of specifying as an actual coordinate a coordinate of the calibration point in a two-dimensional orthogonal coordinate system set in the projecting plane;

a camera posture setting function of setting an initial coordinate that specifies each calibration point in the projecting plane when the on-board camera is mounted at the designed position in the designed posture, based on camera parameters defining the relationship between the camera coordinate system and the reference coordinate system;

an initialization function of initializing camera adjustment values for correcting the camera parameters in accordance with the actual mounting posture of the on-board camera, the camera adjustment values corresponding to displacement amounts from the designed posture and having three adjustment values corresponding to rotation angles about respective three coordinate axes of the camera coordinate system;

a first coordinate conversion function of converting the initial coordinate into a first converted coordinate with using the camera adjustment values which are yet unfixed;

a first adjusting function of calculating one or two adjustment values from among the adjustment values constituting the camera adjustment values, based on the first converted coordinate and the actual coordinate, and of updating the camera adjustment values;

a second coordinate conversion function of converting the initial coordinate to a second converted coordinate with using the camera adjustment values which are updated by execution of the first adjusting function and are yet unfixed;

a second adjusting function of calculating the other adjustment values than the one or two adjustment values calculated by the execution of the first adjusting function from among the adjustment values constituting the camera adjustment values, based on the second converted coordinate and the actual coordinate, and of updating the camera adjustment values;

an adjustment completion determining function of determining completion of an adjustment of the camera adjustment values under a completion condition that displacement amounts between the first converted coordinate and the actual coordinate and displacement amounts between the second converted coordinate and the actual coordinate are less than respective predetermined reference displacement amounts when the first adjusting function and the second adjusting function are executed, of repeating execution of the first coordinate conversion function, the first adjusting function, the second coordinate conversion function, and the second adjusting function when the completion condition is not satisfied, of terminating the repetition of the execution of the functions and of causing next function to be executed when the completion condition is satisfied; and a camera adjustment value setting function of fixing the camera adjustment values updated with using the adjustment values calculated by the execution of the first adjusting function and the second adjusting function, which camera adjustment value setting function is executed when the completion condition is satisfied after the execution of the adjustment completion determining function.

In one preferred embodiment of the calibration program, the real line, the second real line, the roll angle, the pan angle, the tilt angle, the roll adjustment value, the pan adjustment value, the tilt adjustment value are used in the same context as described above, and in the program, a straight line connecting two of the first converted coordinates in the projecting plane is a converted straight line, in the camera coordinate system, a straight line connecting an origin of the camera coordinate system and a midpoint between the two of the first converted coordinates on the projecting plane is a second converted straight line, the first adjusting function includes: a first difference value calculation function of calculating an angle between the real line and the converted straight line as a difference value of the roll angle; and a first adjustment value calculation function of calculating the roll adjustment value based on the difference value of the roll angle, and updating the camera adjustment values, the second adjusting function includes: a second difference value calculation function of calculating an angle between the second real line and the second converted straight line as a difference value of at least one of the pan angle and the tilt angle; and a second adjustment value calculation function of calculating at least one of the pan adjustment value based on the difference value of the pan angle and the tilt adjustment value based on the difference value of the tilt angle, and updating the camera adjustment values, the adjustment completion determining function includes a function of:

determining completion of adjustment of the camera adjustment value under a completion condition that difference values calculated in execution of the first difference value calculation function and the second difference value calculation function are less than the respective predetermined completion threshold values, repeating execution of the first coordinate conversion function, the first difference value calculation function, the first adjustment value calculation function, the second coordinate conversion function, the second difference value calculation function, and the second adjustment value calculation function when the completion condition is not satisfied, and terminating the repetition of the execution of these functions and causing next function to be executed when the completion condition is satisfied.

These calibration methods for an on-board camera as well as the calibration programs for an on-board camera have a similar effect to that of the calibration device for an on-board camera descried above. In addition, since the camera adjustment values are repeatedly adjusted until the difference between the converted coordinate and the actual coordinate becomes less than the predetermined completion threshold values, the on-board camera can be calibrated with high precision. In this case, the order of the first adjustment and the second adjustment is set, in view of the influence of one of the first adjustment and the second adjustment on the result by the other adjustment. Therefore, by repeating the calculations, the camera adjustment values can be converged at an early stage.

BRIEF DESCRIPTION OF DRAWINGS

The essence of the above-described invention and further and other features and aspects thereof will become apparent upon reading the following detailed description with reference to the accompanying drawings.

FIG. 22 is a view showing an example of display on a displaying section at the time of start-up of the calibration device.

DESCRIPTION OF EMBODIMENTS

Hereinbelow, an embodiment of a calibration device according to the present invention will be described with reference to the accompanying drawings, taking as an example a case of calibrating a camera 1 (on-board camera) for capturing a rear visual scene of a vehicle 90. The camera 1 (on-board camera) is mounted upwardly of a rear number plate of the vehicle 90 at a position laterally offset from the axle, with an optical axis thereof being oriented downward (e.g. 30 degrees downward from the horizontal). The camera 1 includes e.g. a wide-angle lens having a viewing angle ranging from 110 to 120 degrees, thus being capable of capturing a region extending about 8 meters rearwards. This camera 1 is to be calibrated for absorbing mounting error when it is mounted to the vehicle 90 at e.g. the production factory of the vehicle. Or, the camera 1 is to be calibrated for correcting any displacement thereof which may have occurred due to accumulated traveling vibration or shock applied thereto.

Figure 1:
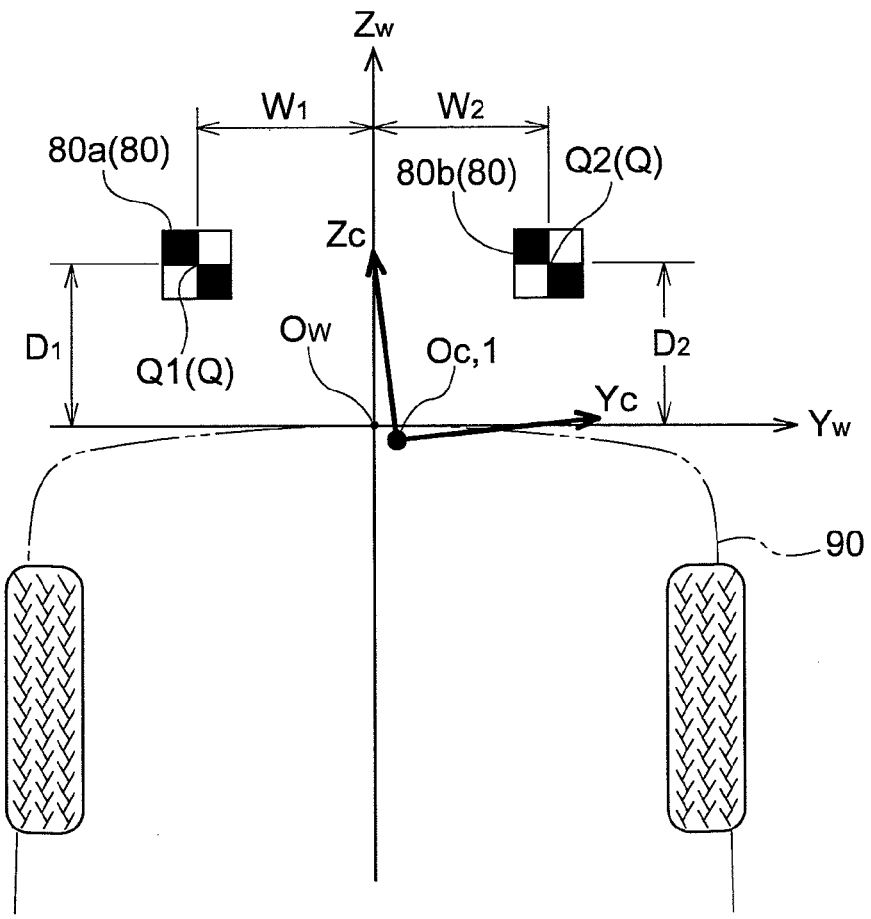
FIG. 1 is an explanatory view showing an example of a disposing relationship between calibration markers and a vehicle.
Figure 2:
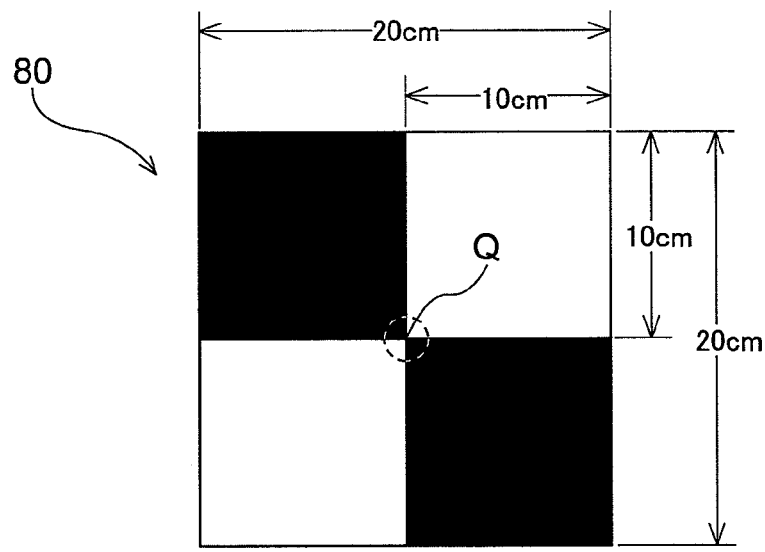
FIG. 2 is an explanatory view showing an example of the calibration marker.

As shown in FIG. 1, in the present embodiment, a marker 80 (calibration index) is provided at two positions within the view field of the camera 1. The markers 80 are disposed at designed positions so that their coordinates in a world coordinate system (reference coordinate system) may be known. In the present example, the marker 80 has a black and white checkered pattern as shown in FIG. 2. The point Q at the center of the marker 80 is a calibration point, which constitutes a standard for the calibration of the camera 1. That is to say, the marker 80 is disposed such that the coordinate of the calibration point Q in the world coordinate system is known.

Incidentally, in the present example, a calibration index 8 is comprised of four squares, i.e. two white squares and two black squares. Alternatively, the marker 80 may be comprised of four or more squares or rectangles. The number of squares is not particularly limited in this invention. And, the markers 80 may be provided at three or more positions, or at any number of plurality of positions. And, the calibration points Q too may be provided at three or more differing coordinates. In addition, the color is not limited to white and black, and other color may be used for coloring the marker 80. Further, the outer shape of the marker 80 is not limited to the rectangular shape, and may be a circular shape or any other shapes. Specifically, as long as the calibration point Q at the center is excellently detected, any shape can be adapted.

In the example shown in FIG. 1, the two markers 80 are disposed on a floor face corresponding to a $Y_W$-$Z_W$ plane in the world coordinate system, in right/left symmetry relative to the main axis of the vehicle corresponding to a $Z_W$-axis of the world coordinate system ($D_1 = D_2$, $W_1 = W_2$). However, the right/left symmetric layout is not absolutely needed, and its layout may be freely chosen as long as the markers 80 are within the field of view of the camera 1 and the coordinate values are known. Common layout of the markers 80 among different factories or the like will be advantageous in that a same calibration device may be commonly used therein. However, some difference in the layout or disposition of the markers 80 can often be readily coped with by change of the program or parameters. Therefore, the markers 80 may be disposed as desired, depending on such factors as the relationship with the size of the space and other facilities that can be secured at a factory.

The size of the marker 80 may be appropriately chosen according to such factors as the resolution of the camera 1, the performance of the image processing function provided in the calibration device, the disposing position of the marker, etc. so that the calibration point Q may be detected with high precision. As an example, in a case where $D_1$ and $D_2$ range from 1 to 2 meters and $W_1$ and $W_2$ are about 1.5 meters, as shown in FIG. 2, there will be employed a 20 to 30 cm square marker 80, with each white/black area being 10 to 15 cm square.

Incidentally, the markers 80 may be disposed on a vertical face such as a wall face or a partition. In such case too, the world coordinates ($X_W$, $Y_W$, $Z_W$) of the calibration point Q can be detected with precision. That is to say, the markers 80 may be disposed on any desired face including a floor face and a wall face, as long as such face is within the field of view of the camera 1. In the present embodiment, since the camera 1 is mounted with the downward orientation on the vehicle, it is not appropriate to dispose the markers 80 on a ceiling face. However, it is needless to say that the markers 80 may be disposed on the ceiling face, in a case where this ceiling face is within the field of view of the camera 1. Also, the markers 80 need not be disposed orthogonal to the axes of the world coordinates ($X_W$, $Y_W$, $Z_W$). Further, the two markers 80 may be disposed on different faces, e.g. one of them being disposed on the floor face, the other being disposed on the partition. What is important here is the calibration points Q, and the markers 80 may be disposed on any desired face(s). Namely, the disposing direction of the markers 80 can be freely chosen as long as the calibration points Q can be precisely disposed in the world coordinate system and the calibration points Q can be detected well from a captured image of the camera 1.

In the instant embodiment, the vehicle 90 mounts a parking assistance device and the visual scene around the vehicle 90 captured by the camera 1 is utilized by this parking assistance device. This parking assistance device is configured to be manually set by a driver at the time of a reverse driving for a garage parking, a parallel parking, etc. or to be automatically set for guiding the vehicle 90 to a parking location confirmed by the driver. In this guiding, e.g. a steering angle of a steering wheel maneuvered by the driver is detected and an expected path of the vehicle 90 resulting therefrom will be displayed in superposition with the captured image. In a further guiding operation, a steering control will be automatically effected to guide the vehicle 90 to the parking location.

Figure 3:
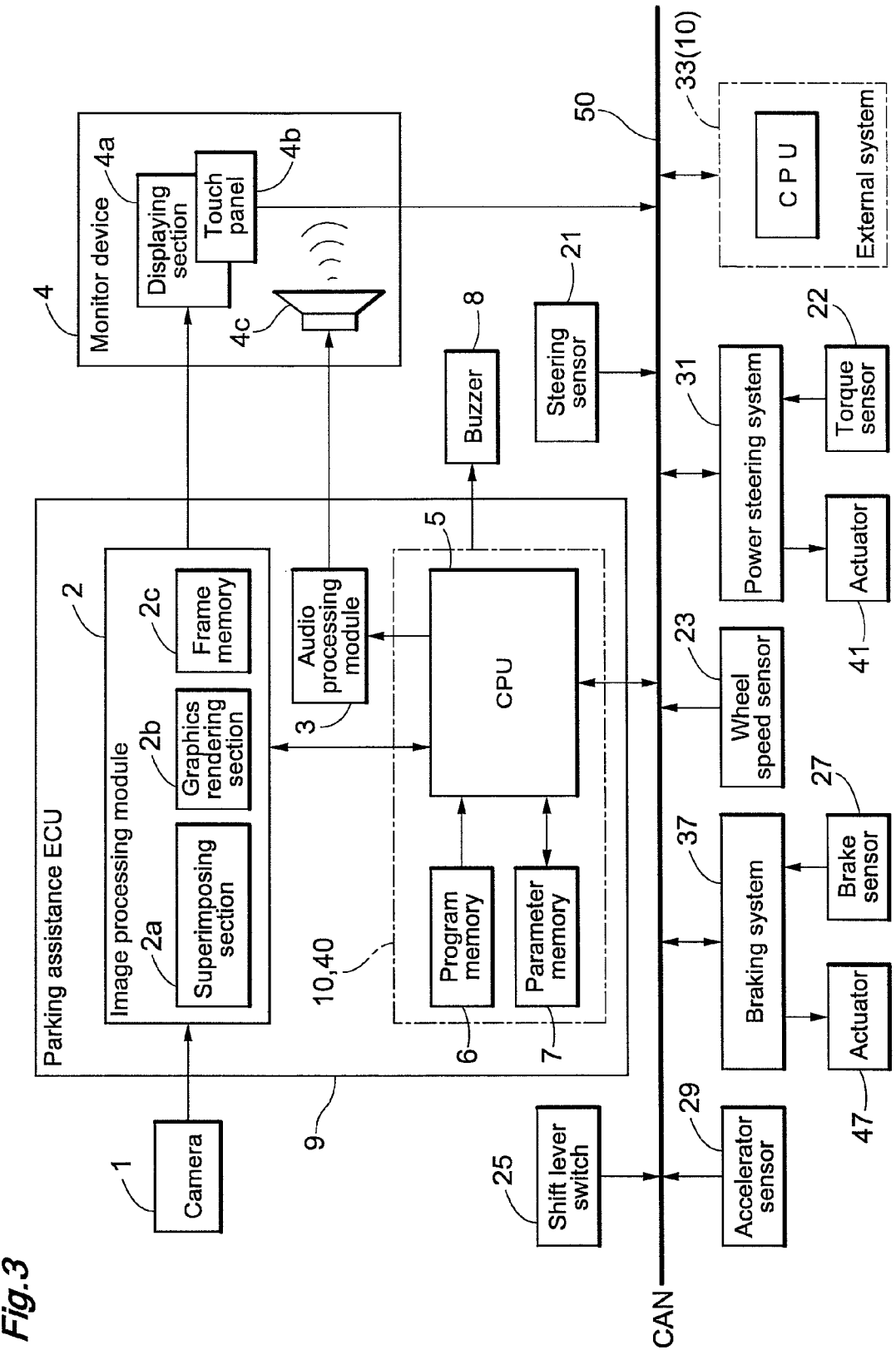
FIG. 3 is a block diagram schematically showing an example of an on-board system construction including a calibration device for an on-board camera according to the present invention.

FIG. 3 is a block diagram schematically showing an example of a system construction of the vehicle 90 mounting such a parking assistance device 40. The parking assistance device 40 includes a CPU (central processing unit) 5 for executing various sophisticated image processing, such as image recognition, as will be described later, and constituting the core component of the parking assistance device 40. The CPU 5 executes various operations with utilizing programs stored in a program memory 6 and/or parameters stored in a parameter memory 7. In this example, these program memory 6 and parameter memory 7 comprise non-volatile memories provided separately from the CPU 5. However, these memories may be integrated within a same package as the CPU 5. The parking assistance device 40, together with the CPU 5, the memories and other peripheral circuits, are constructed as a parking assistance ECU (electronic control unit) 9. In this example, the CPU 5 constitutes the core component. However, the core component of the parking assistance device 40 may be any other logical operation processor, such as DSP (digital signal processor), a logic circuit, etc.

As shown in FIG. 3, the image captured by the camera 1 is displayed on a monitor device 4, via an image processing module 2 including such components as a superimposing section 2a, a graphic rendering section 2b, a frame memory 2c, etc. The camera 1 is a digital camera configured to capture (pick-up) from 15 to 30 frames per second of two dimensional images with using an image pickup device such as CCD (charge coupled device) and CIS (CMOS image sensor), and effect digital conversion of the image and output video data. Each frame of the two-dimensional image is stored in the frame memory 2c and image processing and graphic superposition for each frame are possible. An image graphic rendering instruction to the graphic rendering section 2b and a graphic superimposing instruction to the superimposing section 2a are issued from the CPU 5.

The monitor device 4 functions also as a monitor device for a navigation system. As shown in FIG. 3, the monitor device 4 includes a displaying section 4a, a touch panel 4b provided in the displaying section 4a, and a speaker 4c. The displaying section 4a displays the captured image of the camera 1, a graphic image, a composite image comprising these images, etc., all provided from the image processing module 2. As an example, the displaying section 4a is comprised of a liquid crystal display. The touch panel 4b is formed with the displaying section 4a and constructed as a pressure-sensitive or electrostatic type instruction inputting device capable of outputting a touched position touched by a finger or the like as location data. FIG. 3 shows the example in which the speaker 4c is included in the monitor device 4. Instead, the speaker 4c may be provided at any other location such as on an inner side of a door. The speaker 4c outputs a voice or a sound provided from an audio processing module 3 in accordance with an instruction from the CPU 5. Incidentally, the CPU 5 may be configured to simply issue an alarm sound by a buzzer 8, when needed.

The CPU 5 is connected to various kinds of systems and sensors via an on-board network indicated by a reference character 50 in FIG. 3 to be capable of communicating with them. In the instant embodiment, a CAN (controller area network) 50 is provided as an example of the on-board network. As shown in FIG. 3, the parking assistance device 40 (CPU 5) is connected with a power steering system 31 and a braking system 37 mounted on the vehicle and connected also with an external system 33 via an external connection terminal or the like. These respective systems are comprised of electronic circuits as CPU, like the parking assistance device 40, as core components thereof and include ECUs with their peripheral circuits, just like the parking assistance ECU 9.

The power steering system 31 is an electric power steering (EPS) system or an SBW (steer-by-wire) system. This system is configured to perform an automatic steering by providing an additional assist torque through an actuator 41 to the steering wheel operated by the driver or driving the steering wheel and steered wheels through the actuator 41.

The braking system 37 is an electric power braking system or a BBW (brake-by-wire) system including e.g. an ABS (anti-lock braking system) for restricting occurrence of locking of the brake, an antiskid ESC (electronic stability control) for restricting skidding of the vehicle during cornering, and a brake assist for adding a braking force. This system can add a braking force to the vehicle 90 with using an actuator 47. The external system 33 is an optional system, to which a dealer or a user may connect, via a connector, an inspection system and an adjusting system for use in production, inspection, repair, etc. of the vehicle 90.

In FIG. 3, as examples of various kinds of sensors, a steering sensor 21, a wheel speed sensor 23, a shift lever switch 25 and an accelerator sensor 29 are connected to the CAN 50. The steering sensor 21 is a sensor for detecting a steering amount (rotation angle) of the steering wheel and this sensor is comprised with using e.g. a hall element. The parking assistance device 40 is configured to execute various controls by acquiring an amount of steering of the steering wheel by the driver or the amount of steering during the automatic steering from the steering sensor 21.

The wheel speed sensor 23 is a sensor for detecting a rotational amount, rotation numbers per unit time, etc. of the wheels of the vehicle 90 and this sensor is comprised with using e.g. a hall element. The parking assistance device 40 is configured to calculate a travel amount of the vehicle 90 based on information acquired from the wheel speed sensor 23 and executes various controls. The wheel speed sensor 23 may be provided in the braking system 37. The braking system 37 executes various controls by detecting locking of the brake, free spinning of the wheels, a symptom of skidding or the like, based on rotational difference between the right and left wheels or the like. When the wheel speed sensor 23 is provided in the braking system 37, the parking assistance device 40 acquires information through the braking system 37. The brake sensor 27 is a sensor for detecting an operational amount of a brake pedal, and the parking assistance device 40 is configured to acquire information through the braking system 37. The parking assistance device 40 can perform a control such as interrupting or stopping automatic steering by determining that the vehicle is under an inconvenient environment for the automatic steering, in a case where, e.g. the brake pedal is pressed during the automatic steering.

The shift lever switch 25 is a sensor or a switch for detecting a position of a shift lever and this switch is constructed using a displacement sensor and the like. For example, the parking assistance device 40 may start an assistant control when the shift lever is set to a reverse mode, or finish the assistant control when the shift lever is switched from the reverse mode to a forward mode.

A torque sensor 22 detects an operational torque applied by the driver to the steering wheel. In addition, the torque sensor 22 for detecting an operation torque to the steering wheel is also capable of detecting whether or not the driver is gripping the steering wheel. The parking assistance device 40 can perform a control of interrupting or stopping automatic steering by determining that the vehicle is under an inconvenient environment for the automatic steering, in a case where, e.g. the driver is strongly gripping the steering wheel so as to operate the steering wheel during the automatic steering. In addition, during the automatic steering, creeping of the vehicle 90 by idling of an engine is generally utilized. Therefore, the parking assistance device 40 can perform a control of interrupting or stopping automatic steering by determining that the vehicle is under an inconvenient environment for the automatic steering, when the accelerator sensor 29 detects an operation of an accelerator by the driver.

The various kinds of systems and sensors and the modes of their interconnections shown in FIG. 3 are only non-limiting examples. Any other constructions and/or connection modes can be used instead. Further, as described above, the sensors can be connected directly to the CAN 50 or connected thereto via various kinds of systems.

As discussed above, the parking assistance device 40 is comprised of the CPU 5 as its core component and effects various kinds of calculations for parking assistance, in cooperation with the programs (software) stored in the program memory 6. For effecting the above-described parking assistance, it is needed to define a correlation between a coordinate system of the captured image obtained by the camera 1 and a coordinate system of the image for use in the image processing. The parking assistance device 40 includes the parameter memory 7 for storing camera parameters for defining a correlation between the two coordinate systems. More particularly, the parking assistance device 40 functions in cooperation with hardware of the CPU 5, the programs (software)

stored in the program memory 6, and the camera parameters stored in the parameter memory 7.

The camera parameters are values for defining a relationship between the world coordinate system and a camera coordinate system of the camera 1. The designed ideal camera parameter can hardly be obtained due to error or tolerance in precision of an optical system of the camera 1 per se and/or in mounting precision of the camera 1 to the vehicle 90. For example, when the camera 1 is mounted on the vehicle at the designed position and in the designed posture in the world coordinate system which is a three-dimensional orthogonal coordinate system, a mounting error exists. As will be described later, especially an error regarding the posture becomes problematic. Accordingly, by correcting the camera parameter in accordance with an actual mounting posture of the camera 1, the relationship between the world coordinate system and the camera coordinate system of the actual camera 1 is defined. Camera adjustment values are parameters for correcting the camera parameters. The camera adjustment values are values which are variable in accordance with the mounting condition of the camera 1 to the vehicle 90. Therefore, it is necessary to adjust and fix the camera adjustment values during a production process of the vehicle 90, to thereby calibrate the camera 1.

And, it is preferred that the calibration of the camera 1 be made possible periodically at the repairing/maintenance factory of the vehicle 90 or at the time of inspection/repairing/maintenance after application of some excessive shock to the vehicle 90. For this reason, the vehicle 90 mounts a calibration device 10 for calibrating the camera 1. Or, the calibration device 10 is configured to be connectable to the vehicle 90. Incidentally, the above-described camera adjustment values are also stored in the parameter memory 7. The parameter memory 7 is comprised of a rewritable storage medium, so that the camera adjustment values will be revised to new camera adjustment values determined by calibration. The parameter memory 7 may store initial values (designed values) and the camera adjustment values for the camera parameters and they may be adjusted when used, and alternatively, the camera parameters corrected by the camera adjustment values may be stored in addition to the above-described values. Alternatively, the corrected camera parameters alone may be revised and stored.

As one possible mode of implementation, the CPU 5 and the program memory 6 constituting the parking assistance device 40 may be utilized as the calibration device 10. Or, the calibration device 10 may comprise the CPU 5 and a further program memory than the program memory 6 constituting the parking assistance device 40. Still alternatively, the calibration device 10 may be constructed as the external system 33. In the present embodiment, there will be explained an exemplary case in which the CPU 5, the program memory 6 and the parameter memory 7 constituting the parking assistance device 40 are utilized together as the calibration device 10.

First, the camera adjustment values and the coordinate system will be described. The image captured by the camera 1 is two-dimensional, but the actual space is three-dimensional. Therefore, in the parking assistance device 40, there is a need for inter-conversion between the two-dimensional space and the three-dimensional space. And, for this conversion, it is desired that all camera parameters be set with high precision.

The camera parameters can generally be divided into internal parameters and external parameters. The internal parameters of the camera mean parameters relating to the optical system provided inside the camera. In the case of the digital camera, these are parameters set based on a distance between the image pickup device and the center of the lens (focal distance), the size of the image pickup device and the number of pixels, an angle between a vertical row and a horizontal row of the pixels, etc. Strictly speaking, these internal parameters too are not fixed, and each camera may have error or tolerance. However, difference among these errors or tolerances may be considered insignificant as being much smaller than difference in the mounting precision of the camera 1 to the vehicle 90. In this example, it is therefore assumed that the internal parameters have been set with good precision.

Figure 4:
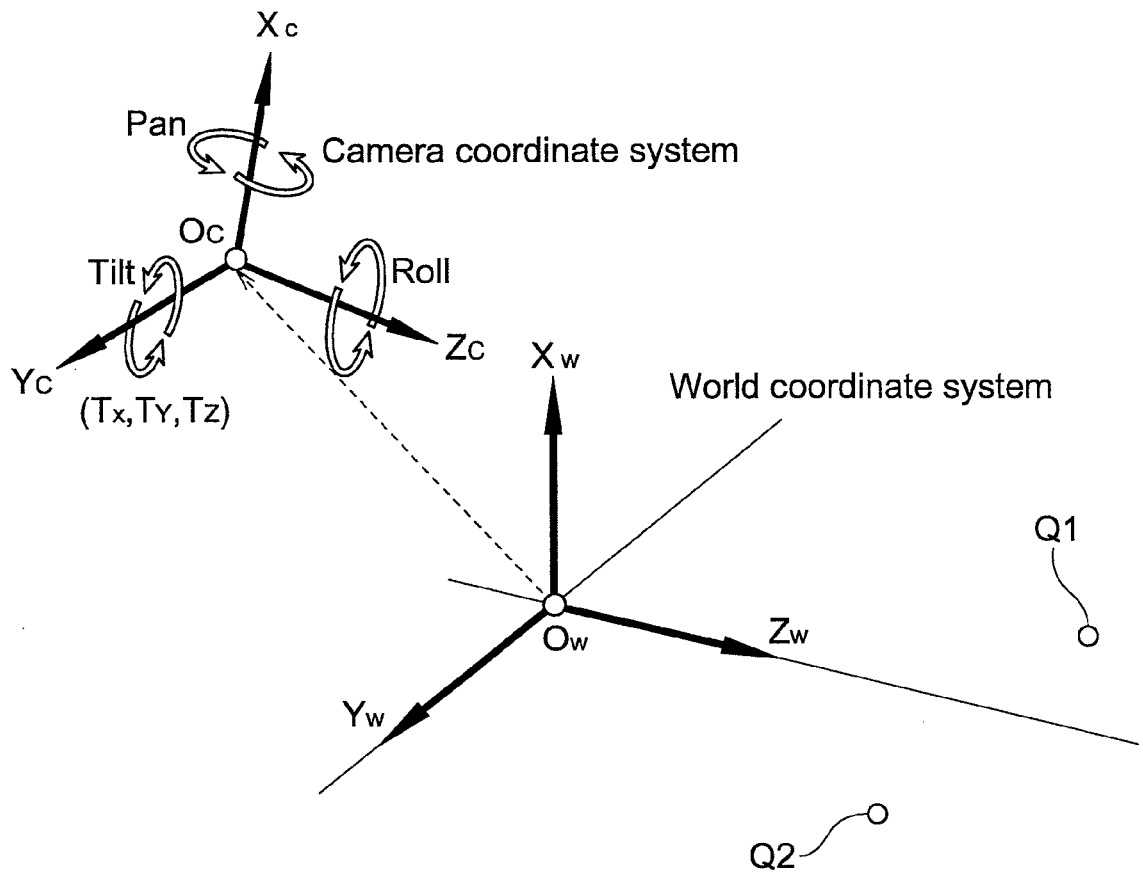
FIG. 4 is an explanatory view showing a relationship between a world coordinate system and a camera coordinate system.

The external parameters are parameters relating to the position and posture of the camera relative to the reference coordinate system (world coordinate system). In the present embodiment, the external parameters correspond to parameters dependent on the mounting precision of the camera 1 to the vehicle 90. The external parameters include translation parameters relating to the camera position and rotation parameters relating to the camera posture. As shown in FIG. 1 and FIG. 4, the camera coordinate system (Xc, Yc, Zc) exists, with one point in the world coordinate system ($X_W$, $Y_W$, $Z_W$), which is the coordinate system of the three-dimensional space, being a coordinate center Oc. That is, the camera 1 will be mounted to the vehicle 90 at a designed position and in a designed posture that form the camera coordinate system about predetermined coordinate in the world coordinate system as the reference coordinate system, as the coordinate center Oc.

The designed position where the camera 1 is to be mounted is defined by the coordinate of the coordinate center Oc of the camera coordinate system in the world coordinate system. The position at which the camera 1 is mounted, that is, the position of the camera coordinate system, is defined by translation components T ($T_X$, $T_Y$, $T_Z$) respectively parallel with the respective axes of the world coordinate system which is a three-dimensional orthogonal coordinate system. In general, the translation components T are defined by a matrix of three rows by one column. If a deviation occurs between the defined position and the actual mounting position of the camera 1, this deviation becomes an error in the translation components T in the external parameters. However, this error in the translation components T gives relatively small feel of strangeness to the driver viewing the captured image. In addition, this error in the mounting position hardly affects an orientation of the optical axis of the camera 1. Therefore, regardless of the distance and positional relationship between the camera 1 and the subject of image capture, its effect on the image processing is small also. Namely, respecting the mounting position of the camera 1, if an appropriate tolerance is set in the production process and this tolerance is appropriately controlled, it is hardly problematic to suppose that the translation parameters have been set with good precision.

The mounting posture of the camera 1, that is, the rotation of the camera coordinate system, is defined by rotation components, about the respective orthogonal axes of the camera coordinate system which is a three-dimensional coordinate system, as shown in FIG. 4. In general, the rotation components are defined by a matrix of three rows by three columns. If a deviation occurs between the defined posture (rotation) and the actual mounting posture of the camera 1, this deviation becomes an error in the rotation components in the external parameters. The error in the rotation component gives a larger feel of strangeness to the driver viewing the captured image, as compared with the error in the translation components T.

Figure 5:
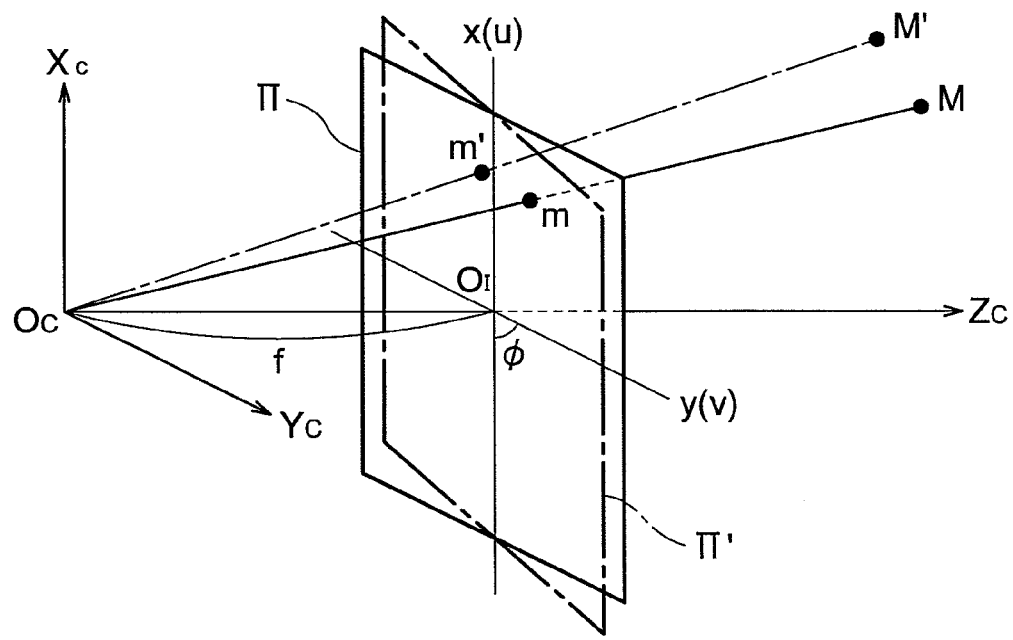
FIG. 5 is an explanatory view showing a relationship between the camera coordinate system and an image coordinate system.

For instance, as shown in FIG. 5, if there occurs a roll, i.e., rotation of the camera 1 about a Zc-axis orthogonal to a projecting plane Π corresponding to the captured image, the captured image will be inclined, thus giving a strong sense of visual discomfort or strangeness to the driver viewing the captured image. Also, in the event of a pan, i.e., rotation of the camera 1 about an Xc-axis which is one of parallel axes to the projecting plane Π, or a tilt, i.e., rotation of the camera 1 about a Yc-axis which is the other of parallel axes to the projecting plane Π, these will result in a change in the orientation of the optical axis of the camera 1. Therefore, depending on the distance and positional relationship between the camera 1 and the image capture subject, the position of the image capture subject will change significantly in the captured image, thus providing significant effect on the image processing as well. Therefore, it is important that the rotation parameters be adjusted with good precision in accordance with the actual mounting posture of the camera 1 to the vehicle 90, thereby to calibrate this camera 1.

As described above, the camera parameters include the internal parameters, the translation parameters and rotation parameters. Of these, high precision adjustment of the rotation parameter, as one of the external parameters, is important. As may be understood from FIG. 1 and FIG. 4 also, even when the camera 1 was mounted to the vehicle 90 without error, there still exists rotation of the camera coordinate system relative to the world coordinate system. Therefore, a rotation parameter R for the case when the camera 1 was mounted at an ideal position and in an ideal posture can be set uniquely as a "designed value". The calibration device 10 according to the present invention is configured to calibrate the camera 1 by obtaining parameters (camera adjustment values) for adjusting these rotation parameters in accordance with the actual mounting posture of the camera 1 and by adjusting the rotation parameters.

As described above, the rotation of the camera 1 has the following effects on the captured image. The roll is appeared as an inclination of the captured image (rotation of the image). The pan and tilt affect the position of the subject in the captured image. Therefore, in the foregoing descriptions, the expression "rotation adjustment" may mean the adjustment of the rotation of all three axes, but sometimes may mean the adjustment of the roll alone in the restricted sense. In addition, in the foregoing descriptions, the expression "position adjustment" may mean the adjustment of the translation components, but sometimes may mean the adjustment of the pan and tilt in the restricted sense.

Now, there will be explained the relationship between a three-dimensional camera coordinate system (Xc, Yc, Zc) and a two-dimensional image coordinate system (x, y). The image coordinate system (x, y) is a two-dimensional orthogonal coordinate system existent in the two-dimensional projective space (projecting plane Π) orthogonal to the Zc-axis of the camera coordinate system in agreement with the optical axis of the camera 1, as shown in FIG. 5. The projecting plane Π is present at a distance of a focal distance (f) of the camera 1 from the origin Oc of the camera coordinate system in a Zc-axis direction of the camera coordinate system. In FIG. 5, a u-axis represents the direction of the vertical row of the pixels of the image pick-up device of the camera 1, while a v-axis represents the direction of the horizontal row of the pixels of the image pick-up device of the camera 1. Ideally, the u-axis and the v-axis are in agreement respectively with an x-axis and a y-axis of the image coordinate system. And, the angle φ formed between the u-axis and the v-axis is ideally 90 degrees, like the angle formed between the x-axis and the y-axis of the image coordinate system. This angle φ is one of the internal parameters described above. In this example, this angle is assumed to be the ideal angle of 90 degrees, as described above.

With precision matching between the camera coordinate system and the world coordinate system, as shown in FIG. 5, a point present at a coordinate M in the world coordinate system will be coordinate-converted from the camera coordinate system to the image coordinate system, as being present at the coordinate (m) in the image coordinate system. Conversely, a point detected in the captured image, i.e. detected at the coordinate (m) in the image coordinate system can be coordinate-converted through the camera coordinate system as a point present at the coordinate M in the world coordinate system, under a fixed condition, such as being present on the floor face.

On the other hand, in the case of absence of precision matching between the camera coordinate system and the world coordinate system, as shown in FIG. 5, a projecting plane Π' of the camera coordinate system of the actual camera 1 becomes a different plane from the projecting plane Π of the ideal camera coordinate system. Therefore, no matching becomes possible between the camera coordinate system of the camera 1 actually mounted on the vehicle 90 and the world coordinate system. For instance, the point present at the coordinate M in the world coordinate system will be detected as being present at a coordinate (m') in the projecting plane Π' of the camera coordinate system of the actual camera 1. And, this coordinate (m') will be treated as the coordinate in the projecting plane Π of the ideal camera coordinate system and will be coordinate-converted through the camera coordinate system to the world coordinate system. That is to say, the point present at the coordinate M in the world coordinate system will be coordinate-converted as a point present at the coordinate M' in the world coordinate system, as shown in FIG. 5.

With occurrence of such error as above, the parking assistance device 40 becomes unable to provide parking assistance with high precision. Then, in order to restrict such error as above, the calibration device 10 is configured to obtain the camera adjustment values and to define a relationship between the camera coordinate system of the camera 1 actually mounted on the vehicle 90 and the ideal camera coordinate system. In other words, the camera adjustment values are adjusted in accordance with the actual posture of the actual posture of the camera 1, in order to correct the rotation parameters of the camera 1 with using the camera adjustment values and make the camera coordinate system of the camera 1 actually mounted on the vehicle 90 be in agreement with the ideal camera coordinate system. In the present embodiment, the camera 1 is calibrated by utilizing a deviation in the image coordinate system occurred in such a point present at the coordinate M in the world coordinate system as described above. Specifically, the camera 1 is calibrated while the coordinate of the calibration point Q (Q1, Q2) of the marker 80 in the world coordinate system is taken as the coordinate M.

Figure 6:
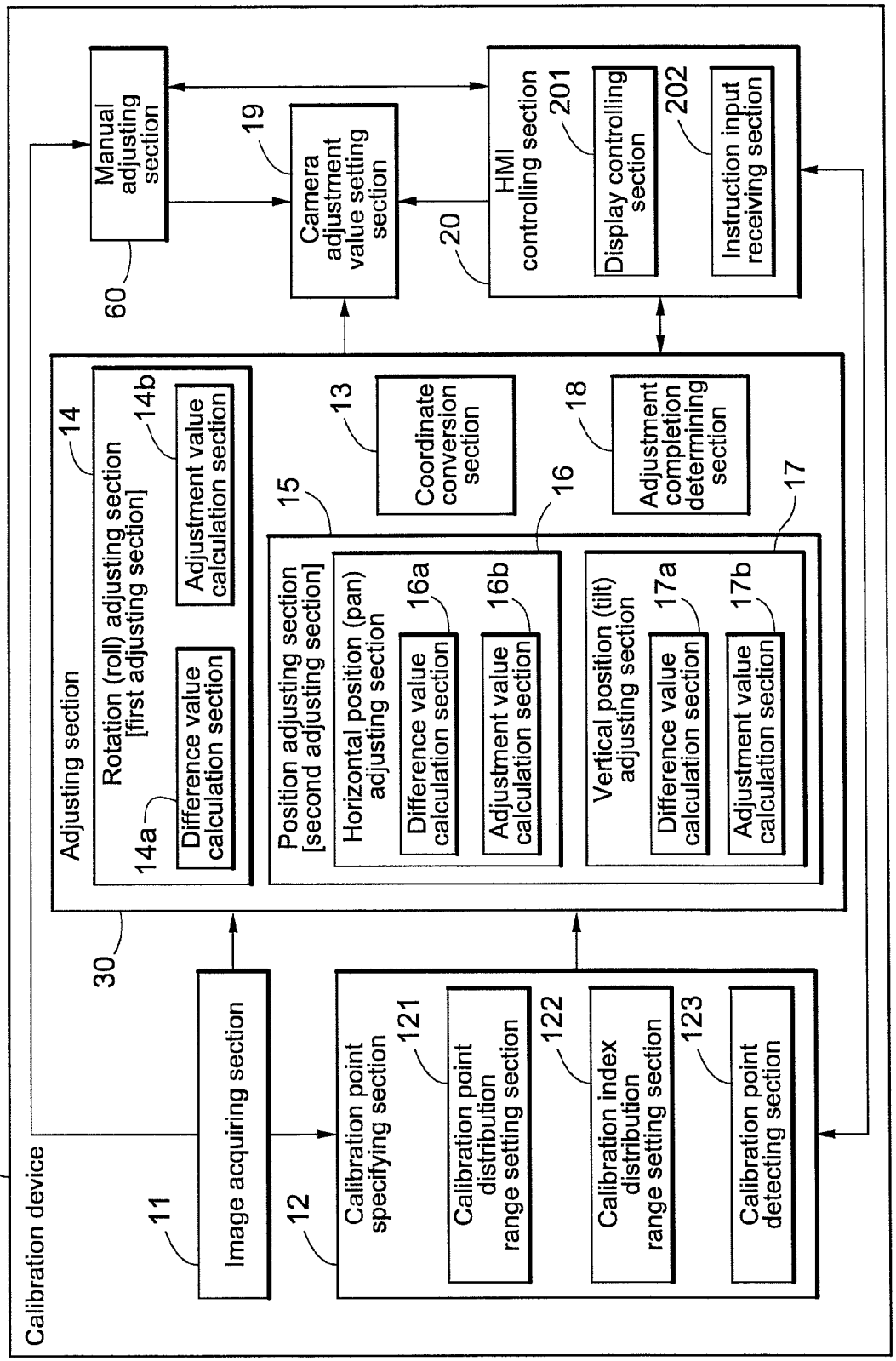
FIG. 6 is a block diagram schematically showing an example of a construction of the calibration device for the on-board camera according to the invention.

As discussed above, in the present embodiment, the CUP 5, the program memory 6 and the parameter memory 7 constituting the parking assistance device 40 are utilized together as the calibration device 10. The calibration device 10 is constituted by inclusion of a plurality of functional sections as shown in FIG. 6, in cooperation with hardware of mainly the CPU 5 and so on and software (programs) stored in the program memory 6. As shown in FIG. 6, the calibration device 10 includes an image acquiring section 11, a calibration point specifying section 12, a coordinate conversion section 13, a rotation adjusting section (first adjusting section) 14, a position adjusting section (second adjusting section) 15, an adjustment completion determining section 18, a camera adjustment value setting section 19 and an HMI controlling section 20. Incidentally, the rotation adjusting section 14 is a functional section for adjusting the inclination (rotation) of the projecting plane Π, i.e. the roll shown in FIG. 4. The position adjusting section 15 is a functional section not for adjusting the translation components, but for adjusting the pan and tilt shown in FIG. 4. The coordinate conversion section 13, the rotation adjusting section 14, the position adjusting section 15 and the adjustment completion determining section 18 together constitute an adjusting section 30.

The image acquiring section 11 is a functional section for obtaining the captured image captured by the camera 1 mounted to the vehicle 90, with including, within the field of view, calibration markers 80 disposed at two different designed positions in the three-dimensional world coordinate system. The calibration point specifying section 12 is a functional section for detecting each calibration point Q in the marker 80 in the captured image and specifying the coordinate of each calibration point Q as the actual coordinate in the two-dimensional orthogonal coordinate system (image coordinate system) set in the projecting plane Π in the camera coordinate system. As will be described later, the calibration point specifying section 12 includes a calibration point distribution range setting section 121, a calibration index distribution range setting section 122 and a calibration point detecting section 123. These respective functional sections will be described in greater details later herein.

The coordinate conversion section 13 is a functional section for converting an initial coordinate which is a coordinate specifying each calibration point Q in the projecting plane Π when the camera 1 is mounted at the designed position and in the designed posture, into a converted coordinate, based on unfixed camera adjustment values. Incidentally, as will be described later, the adjusting section 30 obtains the camera adjustment values by repeating the calculation with the camera adjustment values being corrected. Therefore, the unfixed camera adjustment values used for the coordinate conversion by the coordinate conversion section 13 is corrected as needed in the course of the adjustment, and may take various values.

The rotation adjusting section 14 and the position adjusting section 15 are functional sections for calculating the adjustment values (camera adjustment values) for adjusting the rotation parameter from among the external parameters of the camera described above. The rotation adjusting section 14 is a functional section for: obtaining a difference value in a roll rotation in the camera coordinate system; calculating a roll adjustment value which is a displacement amount in the roll rotation from the designed posture and is one of the adjustment values constituting the camera adjustment values; and updating the unfixed camera adjustment values. Therefore, the rotation adjusting section 14 corresponds to a roll adjusting section. The position adjusting section 15 is a functional section for performing at least one of: "obtaining a difference value in a pan rotation; and calculating a pan adjustment value which is a displacement amount in the pan rotation from the designed posture and is one of the adjustment values constituting the camera adjustment values" and "obtaining a difference value in a tilt rotation; and calculating a tilt adjustment value which is a displacement amount in the tilt rotation from the designed posture and is one of the adjustment values constituting the camera adjustment values", and then updating the unfixed camera adjustment values.

A positional deviation is a two-dimensional deviation, and if it is appreciated in the orthogonal coordinate system, the positional deviation can be defined by deviation in two directions, including a horizontal direction and a vertical direction. Accordingly, the position adjusting section 15 includes a horizontal position adjusting section 16 and a vertical position adjusting section 17. The horizontal position adjusting section 16 corresponds to pan adjusting section, and the vertical position adjusting section 17 corresponds to tilt adjusting section. The horizontal position adjusting section 16 is a functional section for calculating the pan adjustment value which is one of the adjustment values constituting the camera adjustment values. The vertical position adjusting section 17 is a functional section for calculating the tilt adjustment value which is one of the adjustment values constituting the camera adjustment values.

The rotation adjusting section (roll adjusting section) 14, the horizontal position adjusting section (pan adjusting section) 16, and the vertical position adjusting section (tilt adjusting section) 17 respectively include: difference value calculation sections 14a, 16a, 17a for respectively calculating a difference value in the roll rotation, the pan rotation, and the tilt rotation; and adjustment value calculation sections 14b, 16b, 17b for respectively calculating the adjustment value based on the obtained difference value. The details will be described later.

The adjustment completion determining section 18 is a functional section for determining that the adjustment of the camera adjustment values is completed, when the difference values calculated in the rotation adjusting section 14 and the position adjusting section 15 are less than the respective predetermined completion threshold values. The adjusting section 30 including the coordinate conversion section 13, the rotation adjusting section 14, the position adjusting section 15, and the adjustment completion determining section 18 adjusts the camera adjustment values by repeating the calculation with the camera adjustment values being corrected. The adjustment completion determining section 18 finishes the repeating of the calculations when the difference between the corrected coordinate and the actual coordinate approaches the predetermined distance or less, the corrected coordinate being obtained by correcting the initial coordinate with using the unfixed camera adjustment values in the course of the repeated calculation. The details of the adjustment completion determining section 18 will be described later.

Incidentally, a rotation adjustment threshold value and a position adjustment threshold value, which will be described later, correspond to the above-described completion threshold value. In addition, the expression "determining that the adjustment of the camera adjustment values is completed" described above corresponds to determination of the completion of the repeated calculation by the adjusting section 30. As will be described later, the adjustment completion determining section 18 also determines that the repeated calculation by the adjusting section 30 is completed, when the calculation is repeated for a predetermined number of times. At the time of the completion of the repeated calculation, the unfixed camera adjustment values which are the newest at that time are deemed to be set as a temporary camera adjustment values (undetermined camera adjustment values).

The camera adjustment value setting section 19 is a functional section for fixing the adjustment value calculated in the rotation adjusting section 14 and the position adjusting section 15 as the camera adjustment values, based on the determination result by the adjustment completion determining section 18 that the adjustment of the camera 1 is completed. In other words, the camera adjustment value setting section 19 sets the temporary camera adjustment values, which are the unfixed camera adjustment values, as the camera adjustment values. Alternatively, the camera adjustment value setting section 19 may set the temporary camera adjustment values as the camera adjustment values, based on an instruction input through the HMI controlling section 20. The details will be described later.

The HMI controlling section 20 is a functional section for effecting interface function such as reporting to a user (worker of calibration) with using a visual effect or an audio effect, receiving an operation input from the user, and transmitting this to the respective functional sections. For instance, the HMI controlling section 20 issues an instruction to the image processing module 2 for specifying a graphic image to be superposed on the captured image, superposing the graphic image, and causing the processing module 3 to output a voice or sound via the speaker 4c. Further, this section can receive an instruction from the user via the touch panel 4b and causes a functional section corresponding to that instruction to function to that end. As shown in FIG. 6, the HMI controlling section 20 includes a display controlling section 201 and an instruction input receiving section 202. The specific functions of the display controlling section 201 and the instruction input receiving section 202 will be detailed later herein.

Figure 7:
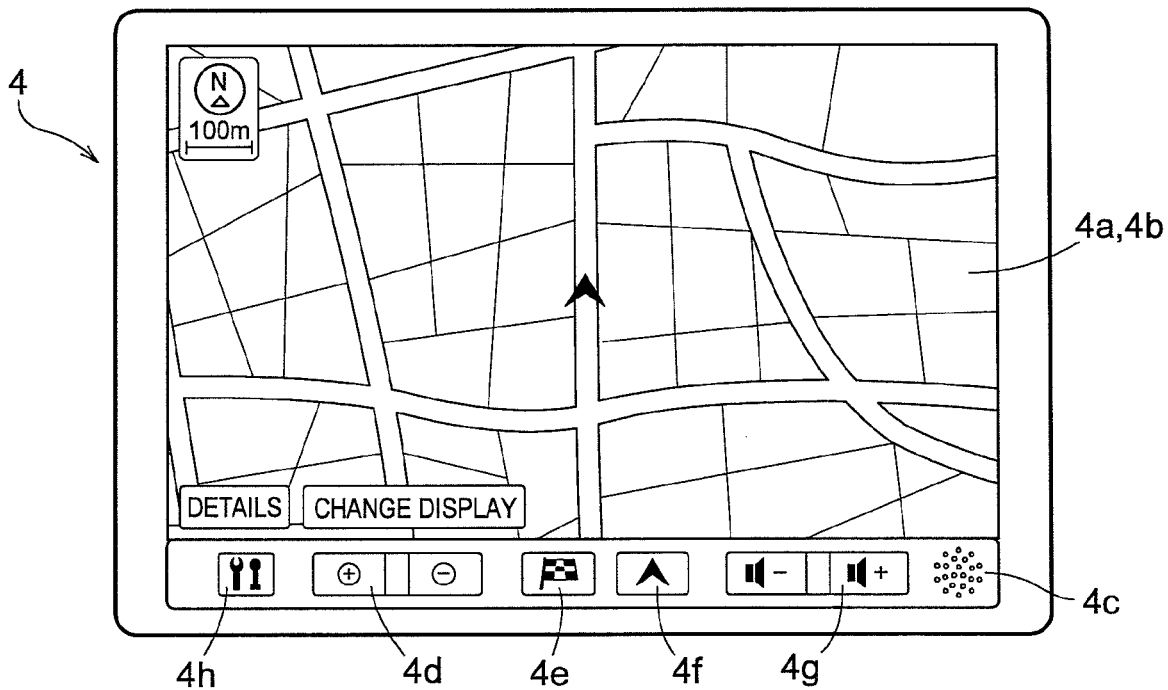
FIG. 7 is a front view showing an example of a monitor device.

In the instant embodiment, the CPU 5 constituting the parking assistance device 40 is utilized as the calibration device 10. The monitor device 4 of the parking assistance device 40 is used also as the monitor device of the navigation system. Therefore, the monitor device 4 is used also as the monitor device of the calibration device 10. In a front panel of the monitor device 4, various switches as shown in FIG. 7 are provided. A reference character 4d denotes a button for changing the scale of the map. A reference character 4e denotes a button for displaying a screen for setting a destination. A reference character 4f denotes a button for displaying the present position of the vehicle 90. A reference character 4g denotes a button for a sound volume level adjustment. A reference character 4h denotes a system setting button for displaying a screen for use in various settings of the system. FIG. 7 shows an exemplary case where a geographical map is displayed together with the present position of the vehicle 90.

In a production factory or a repair factory, a worker will operate the system setting button 4h to cause the displaying section 4a to display the setting screen; then, the worker will operate a predetermined touch button in the touch panel 4b. Then, the instruction input receiving section 202 of the HMI controlling section 20 receives this touch button instruction and the CPU 5 functions as the calibration device 10 with executing various functions defined by a camera calibration program stored in the program memory 6. Incidentally, as an alternative arrangement to the above, in the production process, an initial screen may be set to a camera calibration mode and the initial screen may be changed to the navigation system screen in response to a predetermined operation after completion of calibration of the camera 1.

<Image Acquiring Step>

Figure 8:
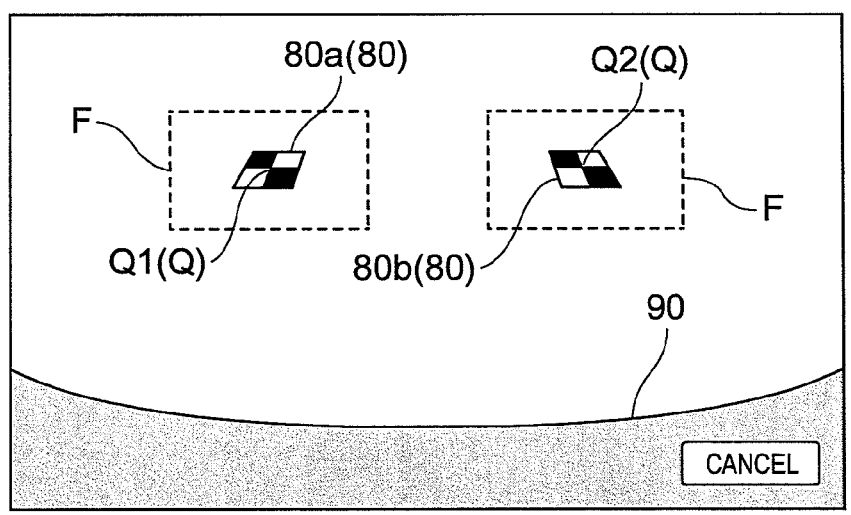
FIG. 8 is a view showing an example of displaying a frame indicative of a region of interest on the monitor device.

With start-up of the camera calibration program, that is, when camera calibration is started by the calibration device 10, first, an image acquiring function is executed by the CPU 5. In other words, the image acquiring section 11 acquires a video image captured by the camera 1. This captured image will be displayed on the monitor device 4 through the image processing module 2, as shown in FIG. 8.

<Calibration Point Specifying Step/Region of Interest Setting Step/Calibration Point Distribution Range Setting Step>

When the captured image is acquired, the CPU 5 executes a calibration point specifying function. Specifically, the calibration point specifying section 12 detects the calibration point Q from the captured mage and sets the coordinate of the calibration point Q in the image coordinate system as the actual coordinate. Prior to the detection of the calibration point Q, a region of interest setting function is executed, and the region on which the image processing is to be effected is set as a region of interest (ROI) in the projecting plane Π. Namely, an image processing target region on which the image processing for detecting the calibration point Q in the captured image is to be effected is set as the region of interest ROI.

This region of interest ROI will be set, based upon a position and a size that are determined taking into consideration a tolerance range in the mounting of the camera 1 and a margin needed for the image processing, with the position in the image (in the projecting plane Π) due to an average value of the tolerance as the reference. This region of interest ROI can be set roughly, for example, based on an empirically obtained tolerance and margin. Since the region of interest ROI is small relative to the captured mage, calculation load for image processing can be alleviated. Further, alternatively, the region of interest ROI may be set with high precision as described below.

According to one preferred embodiment, the CPU 5 executes a calibration point distribution range setting function. Specifically, the theoretical coordinate values (initial coordinate) where the calibration point Q is present will be calculated by the calibration point distribution range setting section 121, based on rotation parameters when the camera 1 is mounted at the designed position and in the designed posture appropriately. And, the range in which the theoretical coordinate values are distributed when the camera 1 has been rotated by a predetermined angle about the respective axis of the camera coordinate system is obtained as a calibration point distribution range. In this case, the region of interest ROI may be set while the deviation of the optical center of the camera (origin of the camera coordinate system), i.e. the deviation of the translation parameters is taken into consideration.

<Calibration Point Specifying Step/Region of Interest Setting Step/Calibration Index Distribution Range Setting Step>

Figure 9:
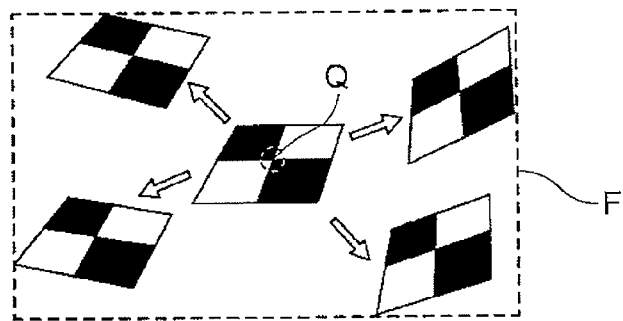
FIG. 9 is an explanatory view illustrating a setting principle of the region of interest.

Next, a calibration index distribution range setting function is executed. Specifically, based upon the calibration point distribution range, the range in which the markers 80 are distributed in the image coordinate system will be set as a calibration index distribution range by the calibration index marker distribution range setting section 122. In the instant embodiment, this calibration index distribution range corresponds to the region of interest ROI. Specifically, as shown in FIG. 9, the region of interest ROI will be set in such a manner that the markers 80 will always be contained therein even when errors from ±3 to 5 degrees occur in each of three axes of the camera coordinate system relative to the case of the optical axis of the camera 1 being oriented to the direction of the designed value. The calibration index distribution range corresponds to the image processing target region on which the image processing for detecting the calibration point Q is substantially effected. Therefore, the calibration index distribution range setting section 122 functions also as an image processing target region setting section.

Herein, it is preferable that the CPU 5 executes a region frame display function. Specifically, it is preferable that the display controlling section 201 causes the displaying section 4a through the image processing module 2 to display the image processing target region or the calibration index distribution range as an ROI frame (region frame) F in the form of a graphic image, in superposition with the captured image (region frame displaying step). The ROI frame F will be displayed together with the captured image as being superposed on this captured image by the displaying section 4a in a green color for instance. The ROI frame F is set in the projecting plane Π such that the calibration marker 80 disposed at the designed position may be located at the center, in a case where the camera 1 is mounted ideally, that is, mounted at the designed position and in the designed posture. Since the calibration point Q is set at the center of the marker 80 as shown in FIG. 2, the ideal calibration point Q will be located at the center of the ROI frame F as illustrated in FIG. 9.

The worker can easily recognize mounting of the camera 1 to the vehicle 90 with a significant error, by finding the marker 80 being out of the ROI frame F. The worker can confirm the mounting condition of the camera 1 with interruption of the calibration by operating a cancel button displayed on the touch panel 4b as shown in FIG. 8, or stop the calibration and remove the vehicle 90 out of the production line as a defect. With the displaying of the ROI frame F in the captured image, the worker can take part in the adjustment operation (calibration operation) of the camera 1 even during on-going automatic adjustment process by the CPU 5. This can be called "semi-automatic adjustment" (semi-automatic calibration) using automatic adjustment and visual confirmation by a worker in combination.

Since suspension or stop of automatic adjustment by the CPU 5 can be instructed by an operation of the touch panel 4b, it can be said that the instruction input receiving section 202 and the HMI controlling section 20 including this section 202 function as an adjustment interrupting section (adjustment interrupting means). It can be also said that the CPU 5 executes an adjustment interrupting function in accordance with the received instruction input. In a case where the camera was mounted with a significant error to the vehicle 90, the adjustment can be interrupted or stopped at an early stage of the adjustment operation, so the productivity is improved. The CPU 5 continues without any pause the process from a calibration point specifying step to the adjusting step, which will be described in detail below. Therefore, it is preferred that the ROI frame F for worker's confirmation be displayed continuously during the automatic adjusting step also. Similarly, it is also preferred that the touch button for providing the instruction input for interrupting or stopping the adjustment be displayed continuously during the automatic adjustment also.

Incidentally, the matching between the region of interest ROI as the target for image processing and the calibration index distribution range is not absolutely needed. With taking a margin into consideration, a region of interest ROI larger than the calibration index distribution range may be set. Further, in the foregoing example, the explanation was made while taking as an example a case where the ROI frame F displayed on the captured image agrees to the region of interest ROI as the target of image processing. However, in such case as the region of interest ROI larger than the calibration index distribution range is set, the ROI frame F may be displayed in superposition and in agreement with the calibration index distribution range. The same applies to the case when no region of interest ROI is set at all and the image processing is effected for the entire region of the captured image. In such case, by finding the marker 80 being out of the ROI frame F, the worker can readily recognize that the camera 1 is mounted to the vehicle 1 with a significant error relative to the designed value. While it is preferred that the region of interest ROI as the target region of image processing and the ROI frame F be in agreement, even when they are not in agreement, similar advantageous effect can be achieved. Therefore, an arrangement that the calibration index distribution range is displayed at the displaying section 4a as being superposed as the ROI frame (region frame) F in the form of a graphic image on the captured image will also be very useful.

<Calibration Point Specifying Step/Calibration Point Detection Step/Edge Detection Step>

After the region of interest ROI is set, a calibration point detection function is executed. In other words, the calibration point section 123 detects the calibration point Q while the image processing is effected within the area of the region of interest ROI. For specifying the calibration point Q, the calibration point detecting section 123 detects the coordinate of the calibration point Q as the center of the marker 80, in the camera captured image. That is, the coordinate in the image coordinate system is detected. As this coordinate is detected based upon the image captured by the camera 1 actually mounted to the vehicle 90, this coordinate corresponds to the "actual coordinate" of the calibration point Q in the present invention. In the case of a checkered pattern being employed as the marker 80 as in the present embodiment, the detection of the calibration point Q is possible with use of the known corner detector.

In the instant embodiment, an edge detection function is effected in which a Canny edge detector incorporating a Gaussian filter is utilized. The Canny edge detector functions not only to store an edge feature, but to remove noise contained in an image. So, stable edge detection is made possible. Details of the Canny edge detector can be found in e.g. J. F. Canny "*Finding edges and lines in images*". Master's thesis, AITR-720. MIT, Cambridge, USA, 1983, etc. So, details thereof will be omitted herein. Needless to say, the invention is not limited to the use of the Canny edge detector. Instead, a Tomasi-Kanade detector, a Harris detector, or any other method can be employed for the edge detection.

<Calibration Point Specifying Step/Calibration Point Detection Step/Distortion Correction Step>
<Calibration Point Specifying Step/Calibration Point Detection Step/Distortion Correction Step>

Figure 10:
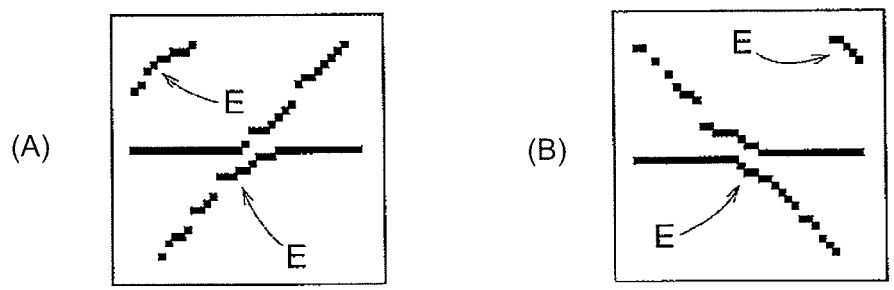
FIG. 10 is an explanatory view showing an example of an image after edge detection.

As described above, the camera 1 has a wide-angle lens, so the captured image thereof has distortion. For the detection of the calibration point Q, straight line recognition is needed, as will be described later. Then, a distortion correction function is executed, and on the image data after edge detection, a distortion correction is effected. Needless to say, alternatively to the above, the distortion correction can be effected before the edge detection, that is, on the original image within the area of the region of interest ROI, or the distortion correction can be effected on the entire captured image. However, since the captured image or the image within the area of the region of interest ROI in the captured image comprise color gray image data, the data amount is large and the calculating load will be significant. In the present embodiment, the data after edge detection comprise monochrome binary data comprising edge point groups E as illustrated in FIG. 10, so the data amount is much smaller and the calculating load is much lower as well. FIG. 10(A) shows edge point groups E of a marker 80a after the implementation of the distortion correction. FIG. 10(B) shows edge point groups E of a marker 80b after the implementation of the distortion correction.

<Calibration Point Specifying Step/Calibration Point Detection Step/Straight Line Detection Step>

Figure 11:
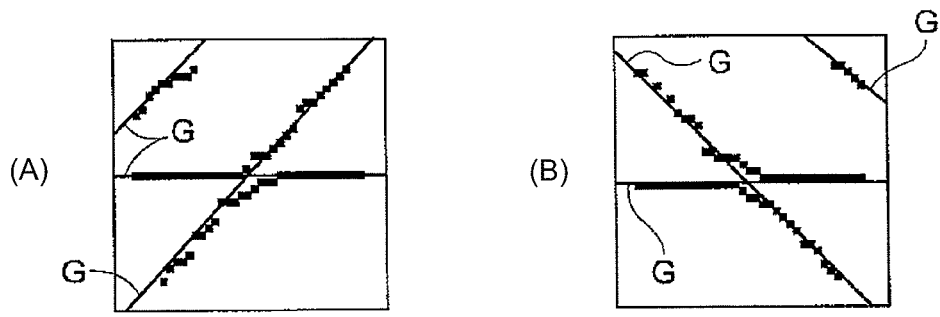
FIG. 11 is an explanatory view showing an example of straight line detection.

Subsequently to the above, a straight line detection function is executed, and on these edge point groups E, a straight line detection operation (straight line matching) is effected. For this straight line detection, such techniques as the least square method, Hough transform, etc. could be used. However, these techniques require large calculating load. So, in the present embodiment, the RANSAC (RANdom SAmple Consensus) method much lower in the calculating load than the above techniques is employed to effect straight line matching for straight line detection. With the RANSAC technique, the minimum number of points required for the straight line matching or curve matching is selected from the edge point group E and a fitting model is set. The minimum number of dots is two in the case of a straight line. So, a straight line connecting randomly selected two points will be set as the straight line model. Then, evaluation is made to what extent the other points in the edge point group E match this straight line model. In succession, two such points will be selected for a predetermined number of times and evaluation will be repeated. And, the straight line model having the highest matching degree will be determined as the straight line model. FIG. 11 shows an example in which straight lines G are applied to the edge point groups E shown in FIG. 10.

<Calibration Point Specifying Step/Calibration Point Detection Step/Intersection Point Calculation Step>

Figure 12:
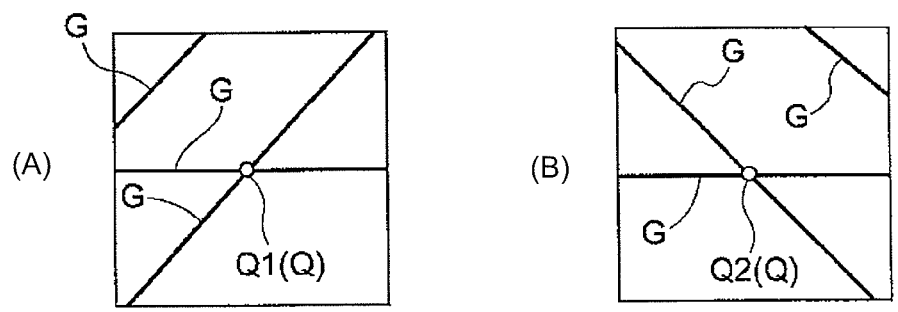
FIG. 12 is an explanatory view showing an example of calibration point detection.

With application of the straight line G, next, an intersection point calculation function is executed, and the coordinate values of the intersection point of the applied straight line G will be calculated. Since the straight line G is a linear function, with simple calculation, an intersection coordinate (calibration point Q) in the image coordinate system can be specified as shown in FIG. 12. Incidentally, since this coordinate is the coordinate (actual coordinate) in the projecting plane of the camera coordinate system of the camera 1 mounted to the vehicle 90, this coordinate will differ from the coordinate in the projecting plane of the ideal camera coordinate system, unless the camera 1 is mounted without any error at all.

<Adjusting Step>

Supposing the camera 1 is mounted at the designed position and in the designed posture without any error at all, that is, in the projecting plane of the ideal camera coordinate system, a theoretical coordinate for specifying each calibration point (P1$_{int}$, P2$_{int}$ which will be described later) is set as the "initial coordinate". That is to say, the "initial coordinate" is the coordinate that specifies the calibration point in the projecting plane by the initial value of the camera parameter (especially the rotation parameter) defining the camera coordinate system relative to the world coordinate system, when the camera coordinate system and the world coordinate system satisfy the ideal relationship with each other. Incidentally, when the camera 1 calibrated once is recalibrated, there may be a case where the camera parameter fixed by the previous calibration result becomes the initial value. Therefore, the expression "initial value" herein means a parameter at the time of the beginning of the calibration (adjustment) being executed at the moment.

This "initial coordinate" will differ from the "actual coordinate" unless the camera 1 is mounted perfectly, i.e. without any error at all. Next, there will be described a process of calibration of the camera 1 in reference to a flow chart of FIG. 13, in which the camera adjustment values are determined through repeated calculation while correcting and adjusting the camera adjustment values.

The initial coordinate is specified by using the rotation parameter defining a relationship between the ideal camera coordinate system and the world coordinate system. Using the unfixed camera adjustment values, the coordinate conversion section 13 converts the "initial coordinate" into the "converted coordinate". To be precise, a coordinate with which a calibration point P (P1, P2), which will be described later, is specified in the projecting plane Π by the rotation parameter corrected with using the camera adjustment values is the "converted coordinate".

Therefore, if the camera 1 is appropriately calibrated and the unfixed camera adjustment values, i.e. the camera adjustment values before the adjustment (initial value) is an appropriate value, the "converted coordinate" is in agreement with the above-described "actual coordinate". When the camera 1 is mounted to the vehicle 90 with an error, the calibration of the camera 1 is not completed, and the camera adjustment values are not appropriate, the "converted coordinate" and the "actual coordinate" do not agree. Therefore, as will be described in detail below, the camera 1 is calibrated by calculating the "camera adjustment values" so that the "converted coordinate" and the "actual coordinate" are in agreement with each other. In the adjusting step which will be described in detail below, a coordinate conversion step is provided and a coordinate conversion function is executed as needed, and thus details of the coordinate conversion function will be explained accordingly.

<Adjusting Step/Initialization Step>

The CPU 5 adjusts the camera adjustment values by executing an adjusting function which will be described below. First, an initialization function is executed. The camera adjustment values are set as Δroll, Δpan and Δtilt so as to correspond to three rotational directions shown in FIG. 4. Upon calculating the camera adjustment values, the CPU 5 initializes various calculation variables. Though not shown in the block diagram of FIG. 6, the CPU 5 and programs may constitute an initialization calculation section. Since the camera adjustment values are adjusted while corrected, the camera adjustment values are one of the calculation variables, and upon starting the calculation, each camera adjustment value is initialized to the initial value, e.g. zero, as represented by the following equation (1) (FIG. 13 #1).

$$\Delta\text{roll}=0, \Delta\text{pan}=0, \Delta\text{tilt}=0 \quad (1)$$

Incidentally, at the production factory, when the camera 1 is calibrated for the first time, it is preferable that all of the values be zero, as represented by the equation (1). Needless to say, in a case where readjustment is performed in the repair factory or repairing/maintenance factory, a nonzero value with which the previous calibration result has been taken into consideration may be set as the initial value.

Figure 13:
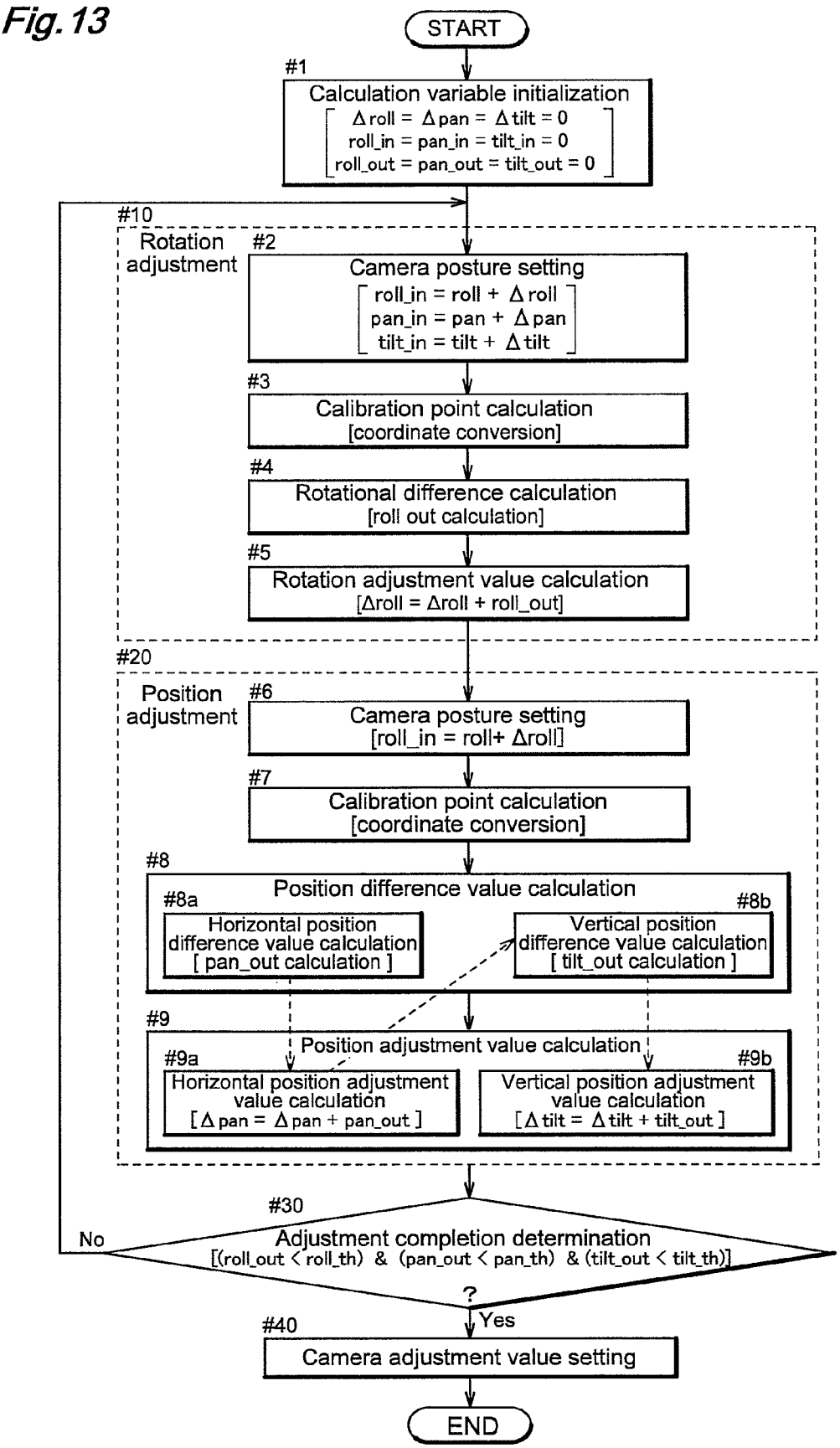
FIG. 13 is a flow chart schematically showing a calculation procedure of a camera adjustment value.

In the initialization step, in addition to the above-described camera adjustment values, as represented by the equations (2)-(3) below, camera posture values (roll_in, pan_in, tilt_in) which are calculation variables at the time of adjustment calculation, as well as the difference values (roll_out, pan_out, tilt_out) at the time of adjustment calculation, are also initialized (FIG. 13 #1). The meanings of these variables will be described later. Incidentally, in the present embodiment, the description will be made while these variables, including the camera adjustment values, represent the rotation angle in the roll rotation, the pan rotation, and the tilt rotation.

$$\text{roll\_in}=0, \text{pan\_in}=0, \text{tilt\_in}=0 \quad (2)$$

$$\text{roll\_out}=0, \text{pan\_out}=0, \text{tilt\_out}=0 \quad (3)$$

<Adjusting Step/Rotation Adjusting Step (First Adjusting Step)/Camera Posture Setting Step>

Subsequently to the initialization step, the adjusting step is executed. The adjusting function with which the calibration program is provided includes a rotation adjusting function and a position adjusting function. In other words, as shown in a flow chart of FIG. 13, a rotation adjusting step (first adjusting step) #10 and a position adjusting step (second adjusting step) #20 are included. In the present embodiment, first, the rotation adjusting function (first adjusting function) is executed. At the beginning of the rotation adjusting function, the CPU 5 executes a camera posture setting function of setting the camera posture (FIG. 13 #2). The camera posture setting function may be included in the a first coordinate conversion function as will be described later. Herein, a case is exemplified in which the rotation adjusting section 14 sets the camera posture and the camera posture setting step (#2) is included in the rotation adjusting step (#10). However, a camera posture setting section for setting the camera posture may be comprised of the CPU 5 and programs. The following equation (4) represents the designed values (roll, pan, tilt) of the camera posture.

$$\text{roll}=\theta_r, \text{pan}=\theta_p, \text{tilt}=\theta_t \quad (4)$$

These are the values showing the camera posture obtained from the rotation parameter in a case where the camera 1 is ideally mounted to the vehicle 90 as defined by the designed values. The designed values (roll, pan, tilt) of the camera posture are also defined by the angles $\theta_r$, $\theta_p$, $\theta_t$ respectively. These are set relative to reference (ref_r, ref_p, ref_t) based on the world coordinate system. In other words, the camera 1 is mounted in a posture having angle deviations of $\theta_r$, $\theta_p$, $\theta_t$, respectively, in roll, pan, tilt components relative to the respective references (ref_r, ref_p, ref_t) based on the world coordinate system, the posture being taken as "designed posture".

When the camera 1 is ideally mounted, based on this camera designed value, the calibration points ($P1_{int}$, $P2_{int}$) present at the "initial coordinates" in the projecting plane Π are in agreement with the detected calibration points Q. As a matter of fact, the posture of the camera 1 frequently includes error, as represented by the equations (5)-(7) below, the camera posture values (roll_in, pan_in, tilt_in) are set by adding the camera adjustment values (Δroll, Δpan, Δtilt) to the designed values (roll, pan, tilt) of the camera posture (FIG. 13 #2).

$$\text{roll\_in}=\text{roll}+\Delta\text{roll} \quad (5)$$

$$\text{pan\_in}=\text{pan}+\Delta\text{pan} \quad (6)$$

$$\text{tilt\_in}=\text{tilt}+\Delta\text{tilt} \quad (7)$$

Herein, since the variables of the camera adjustment values (Δroll, Δpan, Δtilt) are the initial value, the camera posture values are set to respective designed values $\theta_r$, $\theta_p$, $\theta_t$ of the camera posture, as represented by the following equations (8)-(10).

$$\text{roll\_in}=\text{roll}+\Delta\text{roll}=\text{roll}+0=\text{roll}=\theta_r \quad (8)$$

$$\text{pan\_in}=\text{pan}+\Delta\text{pan}=\text{pan}+0=\text{pan}=\theta_p \quad (9)$$

$$\text{tilt\_in}=\text{tilt}+\Delta\text{tilt}=\text{tilt}+0=\text{tilt}=\theta_t \quad (10)$$

<Adjusting Step/Rotation Adjusting Step/Calibration Point Calculation Step (First Coordinate Conversion Step)>

Next, the CPU 5 calculates the calibration point P in accordance with the camera posture values set in the step #2 which have been obtained based on the above-described equations (5)-(7) ((8)-(10)) (FIG. 13 #3). In other words, the CPU 5 executes, when the camera 1 is mounted at the designed position and in the designed posture, the first coordinate conversion function of converting the initial coordinates that specify respective calibration points Q in the projecting plane Π into the converted coordinates (first converted coordinates), with using the unfixed camera adjustment values. The conversion of the "initial coordinate" into the "converted coordinate" is executed by the coordinate conversion section 13. Since the camera adjustment values are the initial values (=zero) herein, the relationship "converted coordinate=initial coordinate" is obtained.

Figure 14:
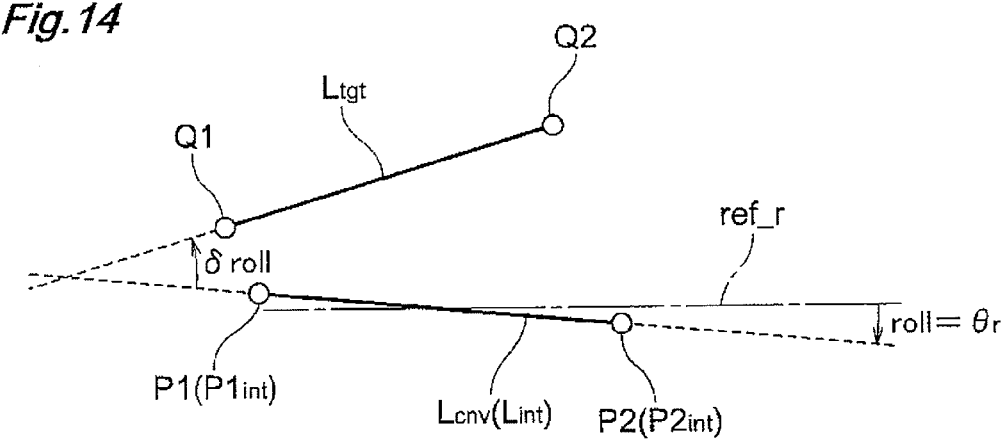
FIG. 14 is an explanatory view showing a relationship between a real line and a converted straight line before calibration.

The calibration point to be coordinate-converted is referred to as "calibration points P (P1, P2)", in order to discriminate from the calibration points Q (Q1, Q2) specified by the calibration point specifying section 12. In FIG. 14, the calibration points Q (Q1, Q2) specified by the calibration point specifying section 12 and the calibration points P (P1, P2) converted by the coordinate conversion section 13 are shown as points in the projecting plane Π (image coordinate system). The coordinate of each of the calibration points Q1, Q2 is the "actual coordinate" and the coordinate of each of the calibration points P1, P2 is the "converted coordinate". In FIG. 14, since the camera adjustment values are the initial values, the calibration points P1, P2 are also the ideal calibration points $P1_{int}$, $P2_{int}$, located at the respective "initial coordinates". Incidentally, as shown in FIG. 14, the designed value roll of the camera posture is set relative to the roll reference (ref_r) based on the world coordinate system.

<Adjusting Step/Rotation Adjusting Step/First Difference Value Calculation Step (Rotation Difference Value Calculation Step)>

As shown in FIG. 14, in the projecting plane Π, there are provided a real line (first real line) $L_{tgt}$ which is a straight line connecting the calibration points Q1 and Q2 as the actual coordinates, and a converted straight line (first converted straight line) $L_{cnv}$ which is a straight line connecting the calibration points P1 and P2 as the converted coordinate. Since the camera adjustment values are the initial values in FIG. 14, the converted straight line $L_{cnv}$ is in agreement with an initial straight line $L_{int}$. The CPU 5 executes a rotation difference value calculation function (first difference value calculation function, roll difference value calculation function). In other words, the difference value calculation section 14a of the rotation adjusting section 14 executes a roll difference value calculation step (first difference value calculation step) for calculating an angle δroll between the real line $L_{tgt}$ and the converted straight line $L_{cnv}$ as difference value roll_out of a roll angle in the roll rotation about the Zc-axis orthogonal to the projecting plane Π (FIG. 13 #4).

Figure 15:
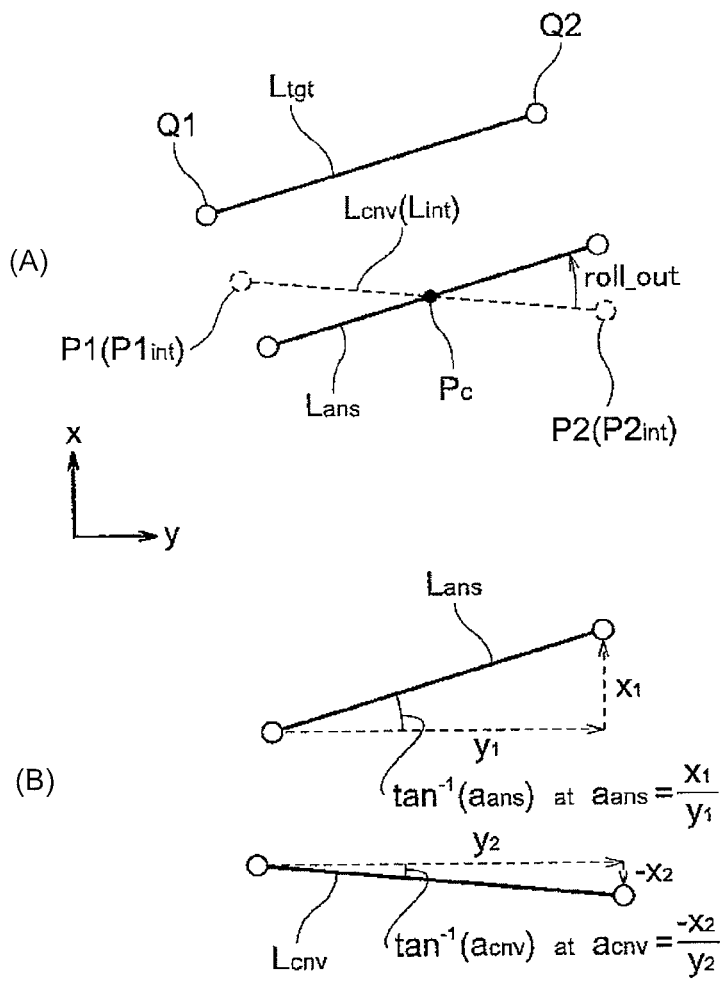
FIG. 15 is an explanatory view showing a principle of rotation adjustment.

Specifically, the difference value calculation section 14a rotates the converted straight line $L_{cnv}$ (line segment connecting the calibration points P1 and P2) by an amount of the angle Broil between the real line $L_{tgt}$ and the converted straight line $L_{cnv}$, about a midpoint Pc of the converted straight line $L_{cnv}$. As a result, as shown in FIG. 15(A), a corrected straight line $L_{ans}$ can be obtained which has the same slope as that of the real line $L_{tgt}$. The differences between the two actual coordinates (Q1, Q2) in both axial directions in the projecting plane Π are equal to the differences ($x_1$, $y_1$) between two points corresponding to the actual coordinate in corrected straight line, as show in FIG. 15(B). Moreover, as shown in FIG. 15(B), the differences between the two converted coordinates (P1, P2) in both axial directions in the projecting plane Π are ($x_2$, $y_2$). In the projecting plane Π, supposing that a slope of the corrected straight line $L_{ans}$ as defined by the differences ($x_1$, $y_1$) is $a_{ans}$ (=$x_1/y_1$), and a slope of the converted straight line $L_{cnv}$ as defined by the differences ($x_2$, $y_2$) is $a_{cnv}$ (=$x_2/y_2$), the difference value roll_out of the roll angle is calculated by the equation (11) below. Incidentally, this difference value roll_out is nearly equal to the angle δroll between the converted straight line $L_{cnv}$ prior to agreement with the real line $L_{tgt}$ and the real line $L_{tgt}$.

$$\text{roll\_out}=\tan^{-1}(a_{ans})-\tan^{-1}(a_{cnv}) \quad (11)$$

<Adjusting Step/Rotation Adjusting Step/First Adjustment Value Calculation Step (Rotation Adjustment Value Calculation Step)>

Once the difference value roll_out of the roll angle is obtained, a rotation adjustment value calculation function (first adjustment value calculation function, roll adjustment calculation function) is executed based on the difference value roll_out, which function is for calculating a rotation adjustment value (roll adjustment value) Δroll which is a displacement amount in the roll rotation from the designed posture (deviation $\theta_r$ of the roll angle) and is one of the adjustment values constituting the camera adjustment values and for updating the camera adjustment values. In other words, the adjustment value calculation section 14b forming the rotation adjusting section 14 executes the roll adjustment value calculation step for calculating the roll adjustment value Δroll. As represented by the equation (12) below, the roll adjustment value Δroll is set in the initialization step #1, by adding the difference value roll_out to the roll adjustment value Δroll before the rotation adjustment, and updating the roll adjustment value Δroll (FIG. 13 #5).

$$\Delta roll = \Delta roll + roll\_out \qquad (12)$$

As described above, the roll adjustment value Δroll is set to the initial value (=zero). Therefore, at this stage, the difference value roll_out obtained by the calculation of the difference value is set as the roll adjustment value Δroll. With this, variables of the camera adjustment values (Δroll, Δpan, Δtilt) will be updated as represented by the following equation (13).

$$\Delta roll = roll\_out, \Delta pan = 0, \Delta tilt = 0 \qquad (13)$$

<Adjusting Step/Position Adjusting Step (Second Adjusting Step)/Camera Posture Setting Step>

Subsequently to the execution of the rotation adjusting function, the CPU 5 executes the position adjusting function (second adjusting function). Subsequently to the rotation adjusting step for adjusting the rotation (roll rotation) in the same plane as the projecting plane Π, the position adjusting section 15 executes the position adjusting step for adjusting the positional deviation in the same plane as the projecting plane Π. Prior to the position adjustment, in order to perform the coordinate conversion (calibration point calculation) on which the result of the rotation adjustment is effected, the camera posture values (roll_in, pan_in, tilt_in) are set again (FIG. 13 #6). In other words, like the beginning of the rotation adjusting function, at the beginning of the position adjusting function, the CPU 5 executes the camera posture setting function and sets the camera posture. This camera posture setting function may be included in a second coordinate conversion function which will be described below. From among the above-described equations (8)-(10), the camera adjustment values (pan_in, tilt_in) concerning the positional deviation are not changed, and thus not set again, while the equation (8) regarding the rotation adjustment value roll_out alone is set again as in the case of the equation (14).

$$roll\_in = \theta_r + \Delta roll \qquad (14)$$

The camera posture setting step may be performed by a camera posture setting section (not shown) like in the step #2 of FIG. 13, or may be by the position adjusting section 15. In this embodiment, a case is exemplified in which the camera posture setting step is executed by the position adjusting section 15, and the camera posture setting step (FIG. 13 #6) is included in the position adjusting step (FIG. 13 #20).

<Adjusting Step/Position Adjusting Step/Calibration Point Calculation Step (Second Coordinate Conversion Step)>

Figure 16:
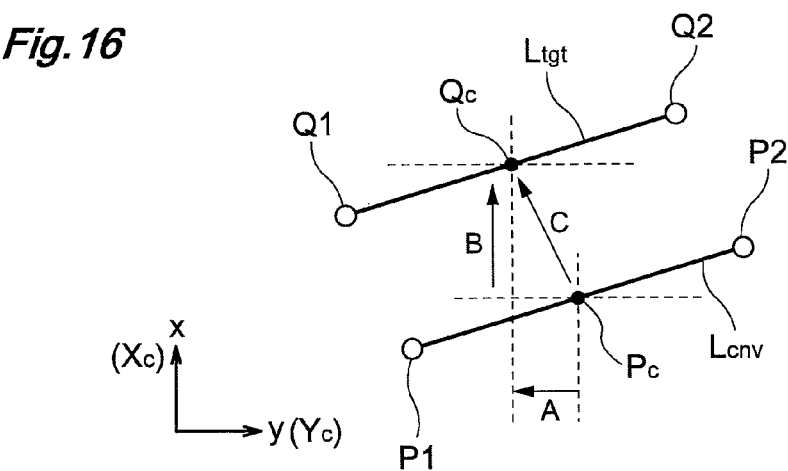
FIG. 16 is an explanatory view showing a principle of position adjustment.

Next, the CPU 5 recalculates the calibration points P1, P2, based on the camera posture values (roll_in, pan_in, tilt_in) set again in the step #6 by using the above-described equations (14), (9) and (10) (FIG. 13 #7). In other words, the CPU 5 executes the second coordinate conversion function of converting the initial coordinate into the converted coordinate (second converted coordinate), with using the unfixed camera adjustment values which have been updated by the execution of the rotation adjustment value calculation function. This conversion is executed by the coordinate conversion section 13. In FIG. 16, the calibration points Q (Q1, Q2) specified by the calibration point specifying section 12 and the calibration points P (P1, P2) obtained in the second coordinate conversion step are shown as points in the projecting plane Π (image coordinate system). Also in FIG. 16, there are shown the converted straight line $L_{cnv}$ obtained by connecting the calibration points P1, P2, and the real line $L_{tgt}$.

<Adjusting Step/Position Adjusting Step/Horizontal Position Adjusting Step and Vertical Position Adjusting Step>

Since the image coordinate system in the projecting plane Π is two-dimensional, the positional deviation lying in the same plane as the projecting plane Π can be defined using two axes, as shown in FIG. 5. In other words, as shown in FIG. 16, the positional deviation can be defined using the deviation amounts in a y-direction and an x-direction in the projecting plane Π. In FIG. 16, the point Pc indicates a midpoint of the segment of the converted straight line, i.e. midpoint of the converted coordinates (second converted coordinates). The point Qc is a midpoint of the segment of the real line, i.e. midpoint of the actual coordinates. For example, when the converted straight line $L_{cnv}$ is shifted in a direction of an arrow A by the deviation amount along the x-axis and in a direction of an arrow B by the deviation amount along the y-axis while the slope is kept, the converted straight line $L_{cnv}$ will be shifted in a direction of an arrow C, and the real line $L_{tgt}$ and the converted straight line $L_{cnv}$ will be in agreement with each other.

In the position adjusting step (second adjusting step), it is possible to effect the shift in the direction of the arrow C at one time, but in the present embodiment, the shift is divided into two steps including the shift in the direction of the arrow A and the shift in the direction of the arrow B. As is apparent from FIGS. 1, 4, and 5, the horizontal direction is the y-axis direction of the image coordinate system, while the vertical direction is the x-axis direction of the image coordinate system. In the present embodiment, as shown in FIG. 13, the position adjusting step (#20) is divided into a horizontal position adjusting step (#8a, #9a) and a vertical position adjusting step (#8b, #9b). In the present embodiment, the CPU 5 executes the vertical position adjusting function after executing the horizontal position adjusting function as indicated with a broken line in FIG. 13. Needless to say, the horizontal position adjusting function can be executed after executing the vertical position adjusting function. Incidentally, a horizontal position adjustment value calculation function (#9a) and a vertical position adjustment value calculation function (#9b) (position adjustment value calculation step (#9)) can be also executed after executing a horizontal position difference value calculation function (#8a) and a vertical position difference value calculation function (#8b) (position difference value calculation step (#8)).

The position adjusting section 15 of the calibration device 10 includes the horizontal position adjusting section 16 and the vertical position adjusting section 17. In addition, the horizontal position adjusting section 16 includes the difference value calculation section 16a and the adjustment value calculation section 16b, like the rotation adjusting section 14. In the same manner, the vertical position adjusting section 17 includes the difference value calculation section 17a and the adjustment value calculation section 17b. The horizontal position adjusting section 16 executes the horizontal position adjusting step, and the vertical position adjusting section 17 executes the vertical position adjusting step.

As described above, in the rotation difference value calculation step (FIG. 13 #4), the converted straight line $L_{cnv}$ is rotated about the midpoint Pc to calculate the corrected straight line $L_{ans}$. Therefore, the coordinate of the midpoint Pc is not changed, and the midpoint Pc of the converted straight line $L_{cnv}$ may be considered as having the same coordinate as that of the midpoint of the initial straight line $L_{int}$. However, at the beginning of the position adjusting step (#20), the roll adjustment value Δroll is set again and the converted straight line $L_{cnv}$ is obtained again.

As shown in FIG. 5, a roll component roll_in of the camera posture values defines the rotation about an origin $O_I$ of the image coordinate system. Supposing that the coordinate (m) in FIG. 5 is the calibration point P in the projecting plane Π, the rotation center is not the midpoint Pc but the origin $O_I$. Therefore, the reconverted midpoint of the converted straight line $L_{cnv}$ may not necessarily have the same coordinate as that of the midpoint of the initial straight line $L_{int}$. As a result, in the position adjusting step (#20), when the point Pc and the point Qc are matched, error in the roll rotation may arise. In this manner, the rotation adjusting step (#10) and the position adjusting step (#20) have influence on each other. Therefore, the calibration device 10 repeats the rotation adjusting step (#10) and the position adjusting step (#20) with the camera adjustment values being corrected, and cause the camera adjustment values to be converged.

In the present embodiment, the adjustment of the camera adjustment values is effected by the steps in a predetermined order of the rotation adjusting step (#10) and then the position adjusting step (#20). This order is set under the condition that a parameter that has a larger influence on other parameters upon adjustment is adjusted first. A magnitude of the influence by the adjustment of one axis on the displacement amount relative to the other axes is not the same among three axes.

The second adjusting section 15 is executed while the adjustment result by the first adjusting section 14 is effected thereon. Therefore, when the adjustment result by the first adjusting section 14 significantly changes due to the adjustment by the second adjusting section 15, the adjustment by the first adjusting section 14 becomes useless. As a result, even when the adjustment is repeated by the first adjusting section 14 and the second adjusting section 15, there is a possibility that the camera adjustment values cannot be converged. Therefore, it is preferable that an axis on which the adjustments by the first adjusting section 14 and the second adjusting section 15 are affected be set in such a manner that the influence of the adjustment by the first adjusting section 14 on the adjustment result by the second adjusting section 15 becomes relatively significant. In other words, it is preferable that the axis adjusted by the first adjusting section 14 is set in such a manner that readjustment error caused by the adjustment by the second adjusting section 15 having adjusted by the first adjusting section 14 becomes smaller than the adjustment error caused by the adjustment by the first adjusting section 14 having adjusted by the second adjusting section 15.

In a case of the camera 1 mounted on the vehicle according to the present embodiment, the influence by the adjustment of the roll on the pan and the tilt is significant. As described above, during the adjustment of the roll, an amount of the rotation of the projecting plane Π about the midpoint Pc of the converted straight line $L_{cnv}$ is calculated, but as a matter of fact, the displacement amount of the roll involves the amount of the rotation about the origin $O_I$ of the image coordinate system. In the present embodiment, in view of the above, the roll angle is adjusted with the first adjusting section 14 being taken as the rotation adjusting section 14, and a pan angle and a tilt angle are adjusted with the second adjusting section 15 being taken as the position adjusting section 15.

<Adjusting Step/Position Adjusting Step/Horizontal Position (Pan) Adjusting Step/Difference Value Calculation Step>

As described above, in the present embodiment, the CPU 5 firstly executes the horizontal position adjusting function (pan adjusting function). The CPU 5 executes the horizontal position difference value calculation function (pan difference value calculation function) which is one of the position difference value calculation functions (second difference value calculation function). In other words, a horizontal position difference value calculation step (pan difference value calculation step), which is one of second difference value calculation steps, is executed (FIG. 13 #8a).

Figure 17:
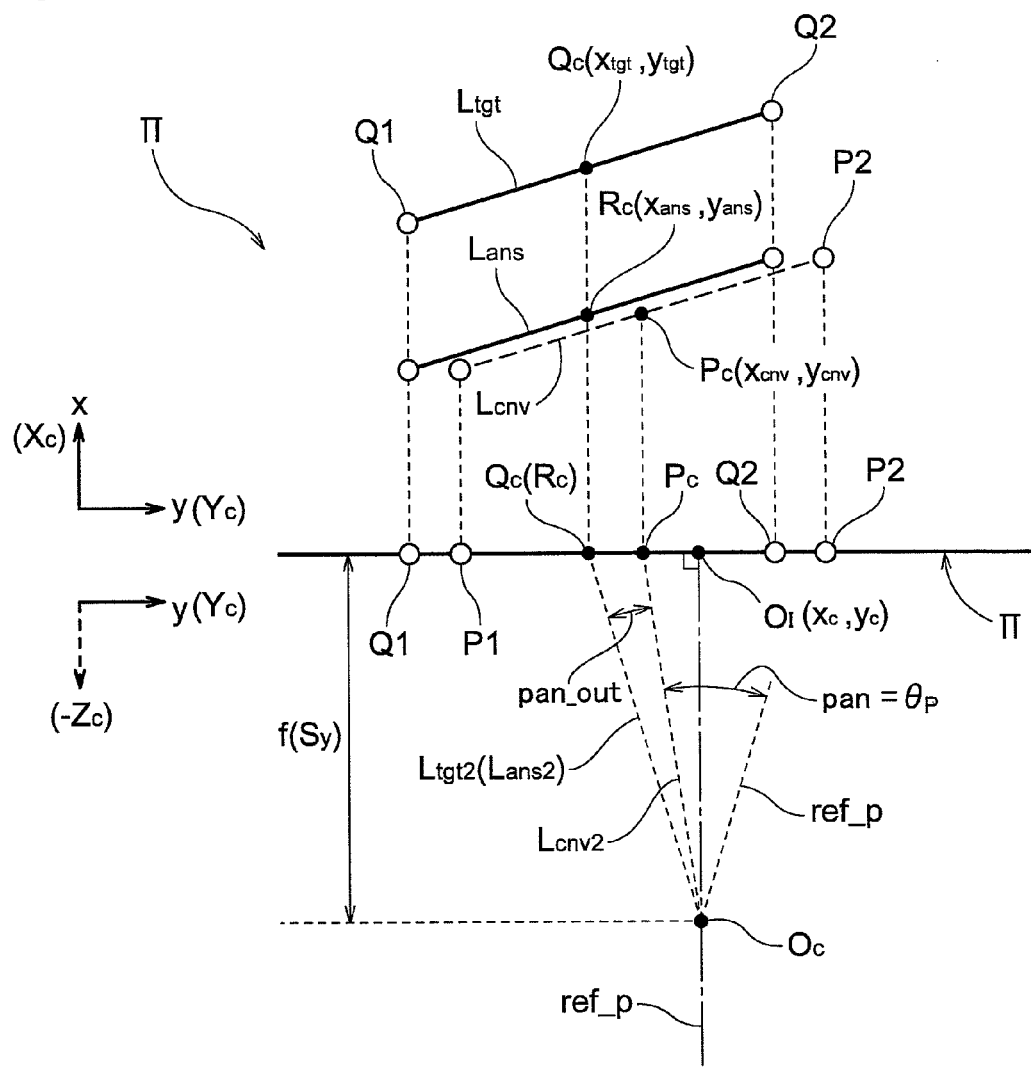
FIG. 17 is an explanatory view showing a principle of horizontal position adjustment.

In the upper section of FIG. 17, a case is shown in which the projecting plane Π is seen in a direction along the Zc-axis of the camera coordinate system, i.e. as facing the projecting plane Π, like in FIG. 16. It may be also said that the drawing shows coordinates in a Yc-Xc plane in the camera coordinate system. The difference value calculation section 16a of the horizontal position adjusting section 16 is configured to make a y-coordinate $y_{cnv}$ of the midpoint Pc of the converted straight line $L_{cnv}$ be in agreement with a y-coordinate $y_{tgt}$ of the midpoint Qc of the real line $L_{tgt}$, as shown in FIG. 17. With this configuration, as shown in FIG. 17, the corrected straight line $L_{ans}$ can be obtained whose y-coordinate is in agreement with the y-coordinate of the real line $L_{tgt}$. A y-coordinate $y_{ans}$ of a midpoint Rc of the corrected straight line $L_{ans}$ is in agreement with the y-coordinate $y_{tgt}$ of the midpoint Qc of the real line $L_{tgt}$.

In the lower section of FIG. 17, a case is shown in which the projecting plane Π is seen in a direction along the Xc-axis of the camera coordinate system, i.e. as seen in a direction along a face of the projecting plane Π. It may be also said that the drawing shows coordinates in a Yc-Zc plane in the camera coordinate system. Herein, the projecting plane Π is shown as a straight line corresponding to the y-axis of the image coordinate system, on which the calibration points P and Q and the midpoints Pc, Qc and Rc as y-coordinate components are plotted. On the straight line showing the projecting plane Π, the origin $O_I$ in the image coordinate system is also plotted.

As shown in FIG. 17, in the camera coordinate system, a straight line connecting the origin Oc of the camera coordinate system and the midpoint Qc between two actual coordinates in the projecting plane Π is referred to as a second real line $L_{tgt2}$. In the horizontal position adjusting step, attention is paid only to the horizontal direction, and thus in the Yc-Zc plane in the camera coordinate system, a straight line $L_{ans2}$ connecting the midpoint Rc of the corrected straight line $L_{ans}$ and the origin Oc of the camera coordinate system is in agreement with the second real line $L_{tgt2}$. In addition, in the camera coordinate system, a straight line connecting the origin Oc and the midpoint Pc between two converted coordinates (second converted coordinates) in the projecting plane Π is referred to as a second converted straight line $L_{cnv2}$.

The difference value calculation section 16a calculates, in the Yc-Zc plane in the camera coordinate system, an angle between the second real line $L_{tgt2}$ and the second converted straight line $L_{cnv2}$ as a difference value pan_out of the pan angle in the pan rotation about the Xc-axis which is one of the parallel axes of the camera coordinate system to the projecting plane Π (FIG. 13 #8a).

As shown in FIG. 5, the origin $O_I$ in the image coordinate system is a point where the Zc-axis of the camera coordinate system and the projecting plane Π orthogonally intersect. The origin $O_I$ of the image coordinate system and the origin Oc of the camera coordinate system are apart from each other at the focal distance (f). Assuming that $k_v$ represents the number of pixels per unit length in the direction of the y-axis of the image coordinate system, i.e. a direction of a v-axis of the image pickup device, a scale factor $S_y$ of the y-axis which is converted from the focal distance (f) in terms of the number of pixels per unit length in the v-direction of the image pickup device is obtained as a product of the number of pixels $k_v$ and the focal distance (f), as represented by the following equation (15).

$$S_y = f \cdot k_v \quad (15)$$

The difference value calculation section 16a of the horizontal position adjusting section 16 calculates an angle between the second real line $L_{tgt2}$ and the second converted straight line $L_{cnv2}$ as the difference value pan_out of the pan angle, based on the y-coordinate $y_c$ of the origin $O_I$ in the image coordinate system, the y-coordinate $y_{cnv}$ of the midpoint Pc of the converted straight line $L_{cnv}$, the y-coordinate $y_{tgt}$ of the midpoint Qc of the real line $L_{tgt}$ (the y-coordinate $y_{ans}$ of the midpoint Rc of the corrected straight line $L_{ans}$), and the scale factor $S_y$ (FIG. 13 #8a). Specifically, the calculation represented by the following equation (16) is executed, and the difference value pan_out of the pan angle is calculated.

$$\text{pan\_out} = \tan^{-1}\left(\frac{y_{ans} - y_C}{S_y}\right) - \tan^{-1}\left(\frac{y_{cnv} - y_C}{S_y}\right) \quad (16)$$

<Adjusting Step/Position Adjusting Step/Horizontal Position Adjusting Step/Adjustment Value Calculation Step>

When the difference value pan_out is obtained, the CPU 5 executes the horizontal position adjustment value calculation function (pan adjustment value calculation function) which is one of the position adjustment value calculation functions (second adjustment value calculation function). In other words, the horizontal position adjustment value calculation step (pan adjustment value calculation step) is performed which is one of the position adjustment value calculation steps (second adjustment value calculation step) (FIG. 13 #9a).

The CPU 5 executes the horizontal position adjustment value calculation function of: calculating, based on the difference value pan_out, the horizontal position adjustment value (pan adjustment value) Δpan from among the position adjustment values, which is a displacement amount in the pan rotation from the designed posture (angle deviation $\theta_p$ of pan) and is one of the adjustment values constituting the camera adjustment values; and updating the camera adjustment values. As represented by the equation (17) below, the adjustment value calculation section 16b of the horizontal position adjusting section 16 forming the position adjusting section 15 adds the difference value pan_out to the pan adjustment value Δpan on which the execution of the horizontal position adjustment is not effected yet, and updates the pan adjustment value Δpan (FIG. 13 #9a).

$$\Delta\text{pan} = \Delta\text{pan} + \text{pan\_out} \quad (17)$$

As described above, the pan adjustment value Δpan is set to the initial value (=zero). Therefore, at this stage, the difference value pan_out at the time of the calibration point calculation is set as the pan adjustment value Δpan. With this, variables of the camera adjustment values (Δroll, Δpan, Δtilt) will be updated as represented by the following equation (18).

$$\Delta\text{roll} = \text{roll\_out}, \Delta\text{pan} = \text{pan\_out}, \Delta\text{tilt} = 0 \quad (18)$$

<Adjusting Step/Position Adjusting Step/Vertical Position (Tilt) Adjusting Step/Difference Value Calculation Step>

Subsequent to the horizontal position adjustment, the CPU 5 executes the vertical position adjusting function (tilt adjusting function) which is one of the position adjusting functions (second adjusting function). The CPU 5 executes the vertical position difference value calculation function (tilt difference value calculation function) which is one of the position difference value calculation functions (second difference value calculation function). In other words, a vertical position difference value calculation step (tilt difference value calculation step), which is one of the second difference value calculation steps, is executed (FIG. 13 #8b).

In the present embodiment, the explanation will be made while taking as an example a case where the converted straight line $L_{cnv}$ which has been set by the coordinate conversion before the horizontal position adjustment is utilized also for the vertical position adjustment. In other words, there is utilized the converted straight line $L_{cnv}$ connecting the calibration points P1 and P2 calculated in the coordinate conversion section 13 based on the camera posture values (roll_in, pan_in, tilt_in) set again in the step #6 by using the above-described equations (14), (9) and (10). In the left section of FIG. 18, a case is shown in which the projecting plane Π is seen in a direction along the Zc-axis of the camera coordinate system, i.e. as facing the projecting plane Π. It may be also said that the drawing shows coordinates in the Yc-Xc plane in the camera coordinate system. Herein, the converted straight line $L_{cnv}$ is shown with a broken line, and the real line $L_{tgt}$ is shown with a solid line.

As described above with reference to FIG. 16, the positional deviation lying in the same plane as the projecting plane Π can be defined using the deviation amount in the y-direction and the x-direction in the projecting plane Π. In the present embodiment, the shift in the direction of the arrow C shown in FIG. 16 at one time is not effected, but the shift is effected in two steps including the shift in the direction of the arrow A and the shift in the direction of the arrow B. The shift in the direction of the arrow A is a shift in the horizontal direction along the y-axis direction in the image coordinate system. This is executed by the horizontal position adjusting section 16 in the horizontal position adjusting step, as described above. Therefore, hereinbelow, the descriptions will be made with respect to the vertical position adjusting step to be executed by the vertical position adjusting section 17.

Figure 18:
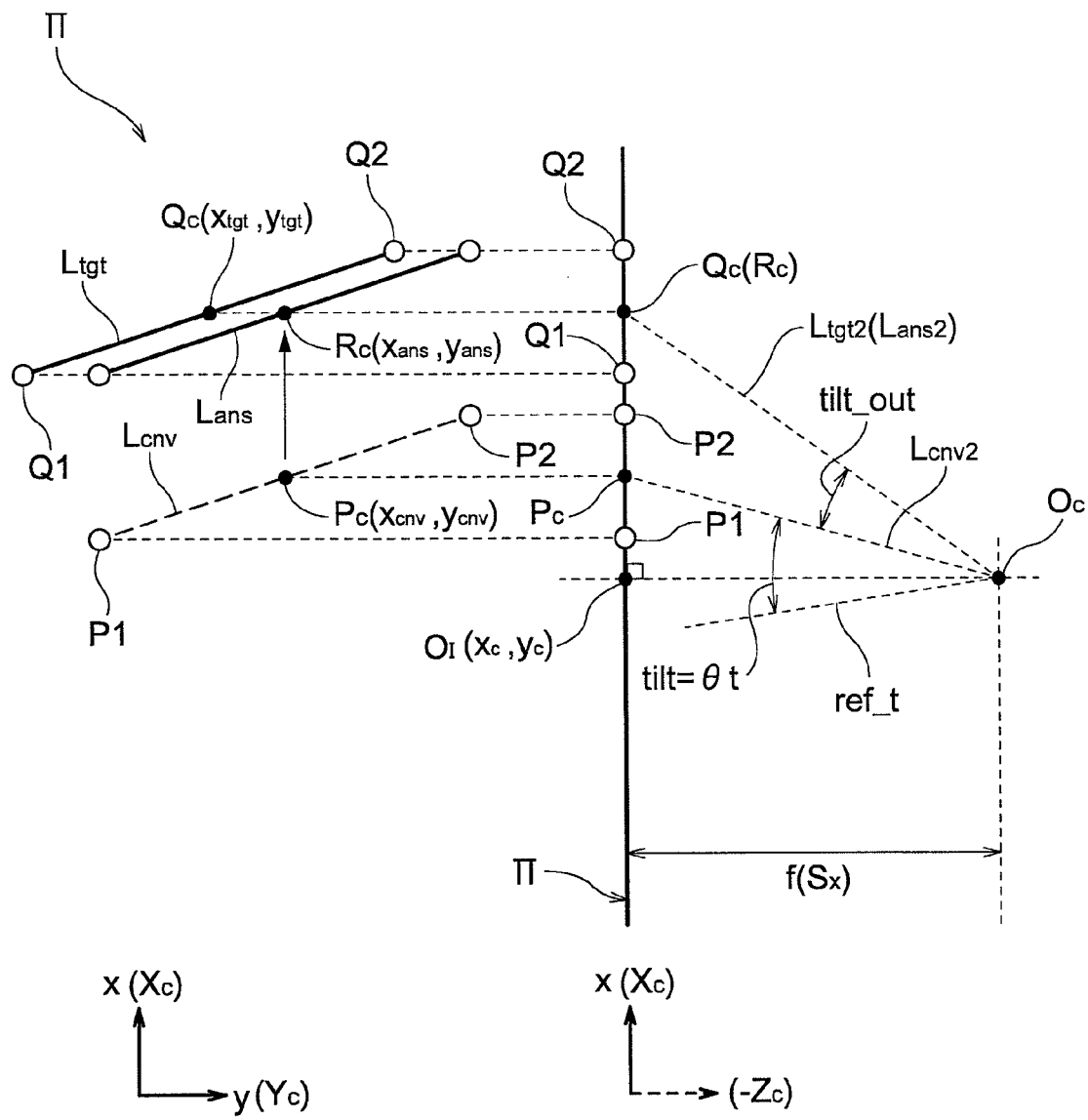
FIG. 18 is an explanatory view showing a principle of vertical position adjustment.

The difference value calculation section 17a of the vertical position adjusting section 17 is configured to make an x-coordinate $x_{cnv}$ of the midpoint Pc of the converted straight line $L_{cnv}$ be in agreement with an x-coordinate $x_{tgt}$ of the midpoint Qc of the real line $L_{tgt}$, as shown in the left section of FIG. 18. With this configuration, as shown in FIG. 18, the corrected straight line $L_{ans}$ can be obtained whose x-coordinate is in agreement with the x-coordinate of the real line $L_{tgt}$. An x-coordinate $x_{ans}$ of the midpoint Rc of the corrected straight line $L_{ans}$ is in agreement with the x-coordinate $x_{tgt}$ of the midpoint Qc of the real line $L_{tgt}$.

Incidentally, in the horizontal position adjusting step (FIG. 13 #8a, #9a), the x-coordinate $x_{cnv}$ of the midpoint is not changed. Therefore, the corrected straight line $L_{ans}$ in the horizontal position adjusting step may be taken as the converted straight line $L_{cnv}$ in the vertical position adjusting step, from which the corrected straight line $L_{ans}$ in the vertical position adjusting step can be obtained. With this arrangement, the coordinate ($x_{ans}$, $y_{ans}$) of the midpoint Rc of the corrected straight line $L_{ans}$ in the vertical position adjusting step and the coordinate ($x_{tgt}$, $y_{tgt}$) of the midpoint Qc of the real line $L_{tgt}$ are in agreement with each other. Namely, in the vertical position adjusting step, the corrected straight line $L_{ans}$ and the real line $L_{tgt}$ will be in agreement with each other. Herein, for easy understanding, a case is exemplified in which the converted straight line $L_{cnv}$ shown in FIG. 16 is utilized for executing the vertical position adjustment. Therefore, it becomes apparent that no problem arises if either the horizontal position adjustment or the vertical position adjustment is executed first.

Incidentally, after the horizontal position adjusting step (#8a, #9a) and before the vertical position adjusting step (#8b, #9b), the coordinate conversion may be performed again to obtain the converted coordinate. However, as is apparent from the fact that the same result is obtained when either of the horizontal position adjustment or the vertical position adjustment is executed first, merely a small effect is obtained by executing the coordinate conversion here. Therefore, it is preferred that horizontal position adjustment and the vertical position adjustment are continuously performed without increasing frequency of the coordinate conversion.

In the right section of FIG. 18, a case is shown in which the projecting plane Π is seen in a direction along the Yc-axis of the camera coordinate system, i.e. as seen in a direction along a face of the projecting plane Π. It may be also said that the drawing shows coordinates in an Xc-Zc plane in the camera coordinate system. Herein, the projecting plane Π is shown as a straight line corresponding to the x-axis of the image coordinate system, on which the calibration points P and Q and the midpoints Pc, Qc and Rc as x-coordinate components are plotted. On the straight line showing the projecting plane Π, the origin $O_I$ in the image coordinate system is also plotted.

As shown in FIG. 18, in the camera coordinate system, a straight line connecting the origin Oc of the camera coordinate system and the midpoint Qc between two actual coordinates in the projecting plane Π is referred to as the second real line $L_{tg2}$, as described above with reference to FIG. 17. In the vertical position adjusting step, attention is paid only to the vertical direction, and thus in the Xc-Zc plane in the camera coordinate system, the straight line $L_{ans2}$ connecting the midpoint Rc of the corrected straight line $L_{ans}$ and the origin Oc of the camera coordinate system is in agreement with the second real line $L_{tgt2}$. In addition, in the camera coordinate system, a straight line connecting the origin Oc and the midpoint Pc between two converted coordinates (second converted coordinates) in the projecting plane Π is referred to as the second converted straight line $L_{cnv2}$.

The difference value calculation section 17a calculates, in the Xc-Zc plane in the camera coordinate system, the angle between the second real line $L_{tgt2}$ and the second converted straight line $L_{cnv2}$ as a difference value tilt_out of the tilt angle in the tilt rotation about the Yc-axis which is one of the parallel axes of the camera coordinate system to the projecting plane Π (FIG. 13 #8b).

As shown in FIG. 5, the origin $O_I$ is a point where the Zc-axis of the camera coordinate system and the projecting plane Π orthogonally intersect. The origin $O_I$ and the origin Oc of the camera coordinate system are apart from each other at the focal distance (f). Assuming that $k_u$ represents the number of pixels per unit length in the direction of the x-axis of the image coordinate system, i.e. a direction of a u-axis of the image pickup device, a scale factor $S_x$ of the x-axis which is converted from the focal distance (f) in terms of the number of pixels per unit length in the u-direction of the image pickup device is obtained as a product of the number of pixels $k_u$ and the focal distance (f), as represented by the following equation (19).

$$S_x = f \cdot k_u \qquad (19)$$

The difference value calculation section 17a of the vertical position adjusting section 17 calculates the angle between the second real line $L_{tgt2}$ and the second converted straight line $L_{cnv2}$ as the difference value tilt_out of the tilt angle, based on the x-coordinate $x_c$ of the origin $O_I$ in the image coordinate system, the x-coordinate $x_{cnv}$ of the midpoint Pc of the converted straight line $L_{cnv}$, the x-coordinate $x_{tgt}$ of the midpoint Qc of the real line $L_{tgt}$ (the x-coordinate $x_{ans}$ of the midpoint Rc of the corrected straight line $L_{ans}$), and the scale factor $S_x$ (FIG. 13 #8b). Specifically, the calculation represented by the following equation (20) is executed, and the difference value tilt_out of the tilt angle is calculated.

$$\text{tilt\_out} = \tan^{-1}\left(\frac{x_{ans} - x_C}{S_x}\right) - \tan^{-1}\left(\frac{x_{cnv} - x_C}{S_x}\right) \qquad (20)$$

<Adjusting Step/Position Adjusting Step/Vertical Position (Tilt) Adjusting Step/Adjustment Value Calculation Step>

When the difference value tilt_out is obtained, the CPU 5 executes the vertical position adjustment value calculation function (tilt adjustment value calculation function) which is one of the position adjustment value calculation functions (second adjustment value calculation function). In other words, as shown in FIG. 13 #9b, the vertical position adjustment value calculation step (tilt adjustment value calculation step) is performed which is one of the position adjustment value calculation steps (second adjustment value calculation step).

The CPU 5 executes the vertical position adjustment value calculation function of: calculating, based on the difference value tilt_out of the tilt angle, the vertical position adjustment value (tilt adjustment value) Δtilt from among the position adjustment values, which is a displacement amount in the tilt rotation from the designed posture (angle deviation $θ_t$ of tilt) and is one of the adjustment values constituting the camera adjustment values; and updating the camera adjustment values. As represented by the equation (21) below, the adjustment value calculation section 17b of the vertical position adjusting section 17 forming the position adjusting section 15 adds the difference value tilt_out to the tilt adjustment value Δtilt on which the execution of the vertical position adjustment is not effected yet, and updates the tilt adjustment value Δtilt (FIG. 13 #9b).

$$\Delta\text{tilt} = \Delta\text{tilt} + \text{tilt\_out} \qquad (21)$$

As described above, the tilt adjustment value Δtilt is set to the initial value (=zero). Therefore, at this stage, the difference value tilt_out of the tilt angle is set as the tilt adjustment value Δtilt. With this, variables of the camera adjustment values (Δroll, Δpan, Δtilt) will be updated as represented by the following equation (22).

$$\Delta\text{roll} = \text{roll\_out}, \Delta\text{pan} = \text{pan\_out}, \Delta\text{tilt} = \text{tilt\_out} \qquad (22)$$

Incidentally, in the description above, a case is exemplified in which the functions are executed in order of the horizontal position difference value calculation function, the horizontal position adjustment value calculation function, the vertical position difference value calculation function, and the vertical position adjustment value calculation function. However, the position difference value calculation function may be executed in which the horizontal position difference value calculation function is first executed and then the vertical position difference value calculation function, and subsequently, the position adjustment value calculation function may be executed in which the horizontal position adjustment value calculation function is first executed and then the vertical position adjustment value calculation function is executed. Alternatively, the adjustment of the horizontal direction and the adjustment of the vertical direction may not be executed separately, and the position difference value calculation function may be executed in which a three-dimensional angle (solid angle) between the second real line $L_{tgt2}$ and the second converted straight line $L_{cnv2}$ is obtained, the solid angle is resolved into the components, and the difference values pan_out and tilt_out are calculated.

<Adjusting Step/Adjustment Completion Determining Step>

As described above, when a series of calculations of the variables of the camera adjustment values (Δroll, Δpan, Δtilt) is once performed, the adjustment completion determining section 18 determines whether or not the adjustment of the camera 1 has been completed. As described above, the adjusting step is repeated with the camera adjustment value being corrected, and thus the adjustment completion determining section 18 determines whether or not the repeated calculation should be terminated. Specifically, the adjustment completion determining section 18 determines that the adjustment of the camera adjustment value is completed, when the difference values (roll_out, pan_out, tilt_out) calculated in the rotation adjusting section 14 and the position adjusting section 15 are less than the respective predetermined completion threshold values.

The completion threshold value for the difference value roll_out of the roll rotation calculated in the rotation adjusting section 14 is a roll adjustment threshold value (rotation adjustment threshold value) roll_th. The completion adjustment threshold value for the difference value pan_out of the pan rotation calculated in the position adjusting section 15 is a pan adjustment threshold value (horizontal position adjustment threshold value) pan_th which is one of the position adjustment threshold values. The completion adjustment threshold value for the difference value tilt_out of the tilt rotation calculated in the position adjusting section 15 is a tilt adjustment threshold value (vertical position adjustment threshold value) tilt_th which is one of the position adjustment threshold values. These three threshold values may be set so as to have different values, but of course, they may be set to the same value. The adjustment completion determining section 18 determines that the adjustment of the camera 1 is completed, when the following logical equation (23) is true (FIG. 13 #30).

(roll_out<roll_th) & (pan_out<pan_th) & (tilt_out<tilt_th)     (23)

Incidentally, these completion threshold values correspond to reference displacement amount in the present invention. In the rotation adjusting section 14 corresponding to the first adjusting section of the present invention, the first converted coordinate and actual coordinate are utilized for calculating the difference value roll_out. The difference value roll_out is the displacement amount between the first converted coordinate and the actual coordinate, expressed in terms of the roll angle. Likewise, in the position adjusting section 15 corresponding to the second adjusting section of the present invention, the second converted coordinate and actual coordinate are utilized for calculating the difference values pan_out, tilt_out. The difference values pan_out, tilt_out are displacement amounts between the second converted coordinate and the actual coordinate, expressed in terms of the pan angle and the tilt angle, respectively. The roll adjustment threshold value roll_th, the pan adjustment threshold value pan_th, and the tilt adjustment threshold value tilt_th which are the completion threshold values relative to the difference values roll_out, pan_out, and tilt_out, respectively, correspond to the reference displacement amounts in the present invention. Therefore, the adjustment completion determining section 18 is a functional section for determining that the adjustment of the camera adjustment values (Δroll, Δpan, Δtilt) is completed, when the displacement amounts between the converted coordinate and the actual coordinate are less than the respective predetermined reference displacement amounts during the adjustment by the first adjusting section 14 and the second adjusting section 15.

The calibration device 10 repeats the steps #2-#30 in the flow chart shown in FIG. 13 to calibrates the camera 1, until "yes" is obtained in the step #30. When the determination of "yes" is obtained in the step #30 in FIG. 13, the calibration device 10 terminates the repetition, and cause the procedure to be out of the loop. For example, the steps described above with reference to FIGS. 14-18 simulate a flow of a first round of this repeated calculation. Since this round is the beginning of the adjustment, it is often the case that the difference values roll_out, pan_out and tilt_out at that time are relatively large. Therefore, in many cases, "no" is obtained as the result of the determination in the step #30, and a second routine is started.

In other words, the CPU 5 determines the completion of the adjustment of the camera adjustment value under a completion condition that the difference values (roll_out, pan_out, tilt_out) calculated in the execution of the rotation difference value calculation function and the position difference value calculation function are less than the respective predetermined completion threshold values (roll_th, pan_th, tilt_th). When this completion condition is not satisfied, the CPU 5 repeats the execution of the first coordinate conversion function, the rotation difference value calculation function, the rotation adjustment value calculation function, the second coordinate conversion function, the position difference value calculation function, and the position adjustment value calculation function. When the completion condition is satisfied, the CPU 5 executes an adjustment completion determining function of terminating the repetition of the execution and performing the next function.

<Repetition of Adjusting Step>

When "no" is obtained as the result of the determination in the step #30, the step #2 is executed again. In the previous round, since all of the camera adjustment values (Δroll, Δpan, Δtilt) are zero as represented by the equation (1), the camera posture values (roll_in, pan_in, tilt_in) at the time of the calibration point calculation were equivalent to the designed values (roll, pan, tilt) of the camera posture, as represented by the equation (2). However, when the step #2 is executed for the second time or later, as represented by the equations (24)-(26) below, the camera adjustment values (Δroll, Δpan, Δtilt) calculated by the previous series of steps (step #10 and step #20) are used.

$$\text{roll\_in} = \text{roll} + \Delta\text{roll} = \theta_r + \Delta\text{roll} \quad (24)$$

$$\text{pan\_in} = \text{pan} + \Delta\text{pan} = \theta_p + \Delta\text{pan} \quad (25)$$

$$\text{tilt\_in} = \text{tilt} + \Delta\text{tilt} = \theta_t + \Delta\text{tilt} \quad (26)$$

Next, in the step #3, the first coordinate conversion function is executed. As represented by the above-described equations (24)-(26), the converted coordinate P converted with using the camera posture values (roll_in, pan_in, tilt_in) which has undergone the first adjustment and been set in the step #2 must be closer to the actual coordinate Q than the converted coordinate P obtained after the first round. As described above, though the adjustment is executed in the first round of the adjustment, since the rotation center of the roll rotation is different and the position adjustment is executed thereafter, there may be cases where error in the roll rotation is generated again. Accordingly, though the converted coordinate P may be closer to the actual coordinate Q as compared with the converted coordinate P in the first round of the adjustments, but may not necessarily be in agreement with the actual coordinate Q.

Subsequently to the step #3, the step #4 is executed, and the difference value roll_out in the roll rotation is calculated based on the equation (11). When the difference value roll_out is obtained, next, in the step #5, as represented by the equation (12), a new roll adjustment value Δroll is calculated by adding the difference value roll_out to the roll adjustment value Δroll at the present moment, and is updated.

Next in the step #6, using the new roll adjustment value Δroll, the camera posture value roll_in is set again with respect to the roll. Assuming that the new roll adjustment value is $\Delta roll_{NEW}$, the camera posture values (roll_in, pan_in, tilt_in) are defined by the following equation (27) and the above-described equations (25) and (26).

$$roll\_in = roll + \Delta roll = \theta_r + \Delta roll_{NEW} \quad (27)$$

Next, in the step #7, the calibration point P is calculated, based on the camera posture values (roll_in, pan_in, tilt_in) defined with using the equations (25)-(27). In addition, the position adjustment in the step #8 is executed, and the difference values pan_out and tilt_out at the time of the position adjustment are calculated with using the above-described equations (16) and (20). Further, the step #9 is executed with using these difference values pan_out and tilt_out, and the position adjustment values Δpan and Δtilt are calculated and updated with using the above-described equations (17) and (21).

<Adjusting Step/Adjustment Completion Determining Step>

When all of the series of the camera adjustment values (Δroll, Δpan, Δtilt) are calculated again, the adjustment completion determining section 18 determines whether or not the adjustment of the camera adjustment values is completed. By repeating the steps #2-#9 for several times, the actual coordinate Q and the converted coordinate P gradually become close. Therefore, the difference values roll_out, pan_out, and tilt_out calculated in the rotation adjusting step (#10) and the position adjusting step (#20) become gradually smaller as the repetition number increases, and thus become converged. For example, it is assumed that the actual coordinate Q and the converted coordinate P become nearly equal to each other, by repeating the series of the steps twice. As a result, the above-described logical equation (23) gives "yes", and the process advances to the next step. Incidentally, though not shown in the flow chart of FIG. 13, even if "no" is obtained at the step #30, in order to suppress the infinite loop of the program, the adjustment completion determining section 18 determines that the adjustment is completed when the calculation is repeated for a predetermined number of times, and the process advances to the next step.

<Confirmation Coordinate Calculation Step>

The camera adjustment values (Δroll, Δpan, Δtilt) at the time of the completion of the repeated calculation determined by the adjustment completion determining section 18 are obtained from the initial values by modifying them, and as needed, they are used in the rotation adjusting step or the position adjusting step. However, these camera adjustment values (Δroll, Δpan, Δtilt) are not fixed values, and the temporary camera adjustment values prior to the fixation (undetermined camera adjustment value). In other words, such values are those temporarily stored in a work area such as a predetermined register of the CPU 5 or a RAM (random access memory).

Herein, it is preferable that the CPU 5 execute a confirmation coordinate calculation function of correcting the initial coordinate to a confirmation coordinate, with using the temporary camera adjustment value. In other words, the coordinate conversion section 13 converts the three-dimensional coordinate values of the calibration points Q in the world coordinate system into coordinate values in the two-dimensional projecting plane Π, by the camera parameter (rotation parameter) which has been corrected with using the temporary camera adjustment value. With this configuration, the theoretical coordinate values of the calibration points Q obtained with using the temporary camera parameters (undetermined camera parameters) at the time of completion of the automatic adjustment are calculated as the confirmation coordinates.

<Adjustment Completion Confirming Step>

Figure 19:
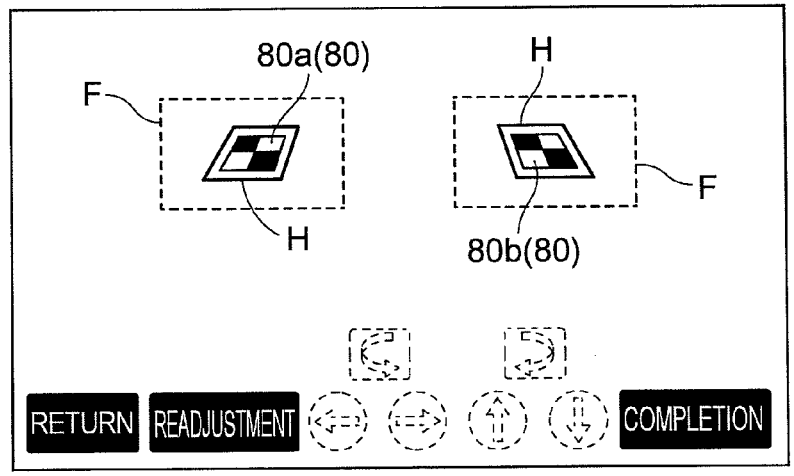
FIG. 19 is a view showing an example of display on the monitor device when camera calibration was successful.

When the confirmation coordinate is calculated, the CPU 5 performs adjustment completion confirmation function of displaying on displaying section a confirmation marker that indicates a position of the confirmation coordinate in the captured image, in the form of graphic image in superposition with the captured image. In other words, the display controlling section 201 of the HMI controlling section 20, as shown in FIG. 19, causes the displaying section 4a of the monitor device 4 to display marker frames H (confirmation markers) or touch buttons in the form of graphic images in superposition with a captured image, through the image processing module 2. The marker frame H is set at the position where the marker 80 is displayed within this frame, in a case where the adjustment has been appropriately completed. The confirmation coordinate becomes the coordinate of the center of the marker frame H. It is preferable that each side of the marker frame H may be set with a margin of 2 to 5 pixels relative to each corresponding side of the marker 80 in the image coordinate system, when the marker 80 is located at the center of the marker frame H. The marker frame H will be sized with a margin (or play) corresponding to the adjustment tolerance provided for the camera adjustment values (Δroll, Δpan, Δtilt). Preferably, the marker frame H is displayed in a different color than that of the ROI frame F, e.g. yellow, in order to avoid confusion with the ROI frame F which is displayed in the green color for instance.

Figure 21:
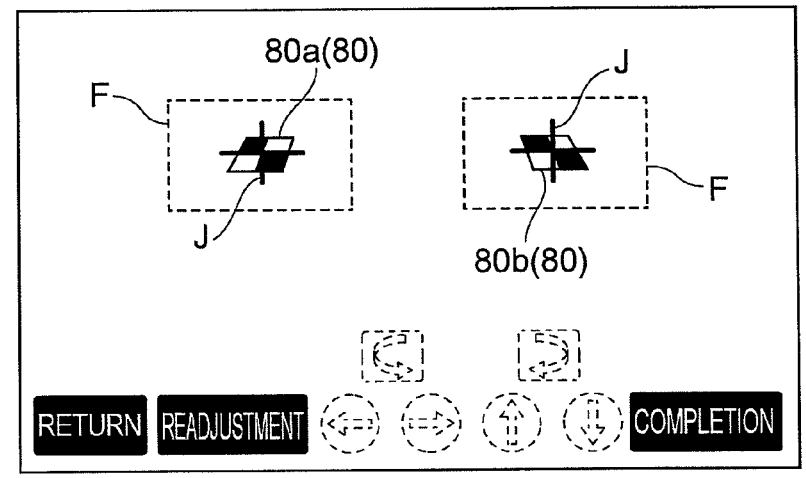
FIG. 21 is a view showing another example of a confirmation marker.

Incidentally, in the above, the rectangular marker frame H is used as the confirmation marker. Instead, a cross-shaped marker J as shown in FIG. 21 may be used. In a case where the confirmation marker is such cross-shaped marker J, as shown in FIG. 21, a cross mark crossing the calibration point P at the confirmation coordinate will be graphically rendered. From the ergonomic point of view, it is said that confirming the target being within a center portion of the frame is easier than confirming agreement between the confirmation marker represented by a cross point of the cross mark and the calibration point. It is also said from the ergonomic point of view that positioning a target within a frame is easier than matching a point with another point. Therefore, it can be said that confirming the marker 80 being displayed within the frame of the marker frame H is easier than confirming agreement between a point at the center of the marker 80 and the cross point of the cross mark of the cross-shaped marker J. For this reason, in this embodiment, the marker frame H is used as the confirmation marker.

As in the present embodiment, when the outer shape of the marker 80 is rectangular, as shown in FIG. 19, it is preferable that the confirmation marker is in a similar shape to the outer shape of the marker 80 that is nearly parallelogram in the captured image. When the outer shape of the marker 80 is circular, it is preferable that the confirmation marker is in a similar ellipsoidal shape to the outer shape of the marker 80 that is nearly ellipse in the captured image. Since the outer shape of the marker 80 is known, an appropriate confirmation marker including the marker 80 can be displayed with a predetermined margin in the captured image.

The worker will confirm the screen by viewing and if the worker finds the marker 80 being within the marker frame H, then, the worker will determine that the calibration of the camera 1 has been completed appropriately, so the worker will operate a completion button in the touch panel 4b. Operations to the touch panel 4b are transmitted via the instruction input receiving section 202 of the HMI controlling section 20 to the adjusting section 30 and the camera adjustment value setting section 19.

<Camera Adjustment Value Setting Step>

The above-described operation to the touch panel 4b in the adjustment completion confirming step is a fixing instruction input for fixing the temporary camera adjustment value as a camera adjustment value. Upon receipt of the fixing instruction input, the CPU 5 executes the camera adjustment value setting function of fixing, as the camera adjustment values, the temporary camera adjustment values (Δroll, Δpan, Δtilt) calculated by executing the rotation adjustment value calculation function and the position adjustment value calculation function. Upon receipt of this fixing instruction input via the instruction input receiving section 202, the camera adjustment value setting section 19 sets the roll adjustment value Δroll, the pan adjustment value Δpan and the tilt adjustment value Δtilt as the camera adjustment values.

Specifically, as shown in FIG. 3, the camera adjustment value stored in the parameter memory 7 connected to the CPU 5 is rewritten by the CPU 5. As described above, the parameter memory 7 is comprised of a rewritable, non-volatile memory, or any other memory having a backup power source. Preferably, a flash memory or an $E^2PROM$ is used. In the camera adjustment value setting step, the adjusted camera adjustment value temporarily stored in a work area of the CPU 5 is written into the parameter memory 7 and updated, whereby the calibration of the camera 7 is completed, e.g. a calibration operation of the camera 1 in a production factory is completed. With this, all the operations by the calibration device 10 are completed and the displaying section 4a of the monitor device 4 will show e.g. a map screen of the navigation system, like the one shown in FIG. 7.

Incidentally, in the embodiment above, the camera adjustment value setting step is executed after it is determined that the completion condition is satisfied in the adjustment completion determining step and the adjustment completion confirming step is executed. Alternatively, the camera adjustment value setting step may be executed after the adjustment completion determining step. The adjustment completion determining section 18 determines the completion of the adjustment of the camera adjustment value under a completion condition that the difference values (roll_out, pan_out, tilt_out) calculated in the rotation adjusting section 14 and the position adjusting section 15 are less than the respective predetermined completion threshold values (roll_th, pan_th, tilt_th). When the completion condition is satisfied, the confirmation is not necessarily needed. Therefore, immediately after the adjustment completion determining step, the camera adjustment value may be written into the parameter memory 7. A case where the camera adjustment value setting step is executed immediately after the adjustment completion determining step is not different from a case where the camera adjustment value setting step is executed after the adjustment completion determining step and further after the adjustment completion confirming step or the like, in that the temporary camera adjustment value is fixed as the camera adjustment value based on the result of the determination of the adjustment completion. In addition, it may be also considered that the adjustment completion confirming step or the like is included in the adjustment completion determining step or the camera adjustment value setting step. Therefore, they are not different in that the temporary camera adjustment value is fixed as the camera adjustment value based on the result of the determination of the adjustment completion.

Incidentally, upon using the camera parameter adjusted by the fixed camera adjustment value, it suffices as long as the initial value (designed value) of the camera parameter and the fixed camera adjustment value are stored in the parameter memory 7. In this case, in the camera adjustment value setting step, the camera adjustment value is written into the parameter memory 7. However, the parameter memory 7 may store the camera parameter adjusted in advance by the camera adjustment value. Therefore, the camera adjustment value setting step includes writing the camera parameter adjusted by the camera adjustment value into the parameter memory 7. In either case, they are not different in that the temporary camera adjustment value whose adjustment has been completed is fixed in the camera adjustment value setting step.

<Readjusting Step (Manual Adjusting Step)>

Figure 20:
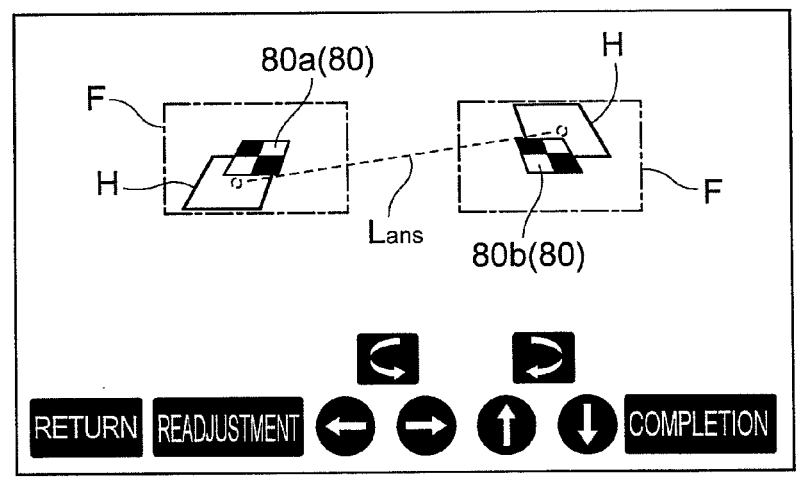
FIG. 20 is a view showing an example of display on the monitor device when camera calibration was not successful.

In the adjustment completion confirming step, if the marker 80 is found not within the marker frame H as shown in FIG. 20, the worker will then determine that the calibration of the camera 1 is not completed yet. As described above, even when the adjustment is repeated for a predetermined number of times but the above-described logical equation (23) does not give "yes", there may be cases where the process advances to the camera adjustment value setting step (FIG. 13 #40) and the adjustment is completed. In this case, as in FIG. 20, there is a possibility that the marker 80 is not within the marker frame H. At this time, the display controlling section 201 displays the marker frame H or the cross-shaped marker J in a different display mode from the mode described above. For instance, the marker frame H or the cross-shaped marker J will be shown with blinking (flashing) or shown with a displaying color, e.g. in the red color, which is different from the above-described yellow color.

Further, the display controlling section 201 causes the ROI frame F to be displayed in a different display mode than the mode when the calibration point detecting section 12 detects the calibration point. As described above, since the CPU 5 continues its processing from the calibration point specifying step to the adjusting step (#10, #20) without any pause, it is preferred that the ROI frame F provided for the worker's confirmation be displayed continuously during the adjusting step also. Therefore, in a case where the ROI frame F has been displayed continuously, the display controlling section 201 will change the display mode of this ROI frame F. For instance, the displaying color of the ROI frame F will be changed from green to red or displayed with blinking so as to caution the worker. As the display mode of the ROI frame F which has been displayed continuously is changed, the visibility for the worker can be improved. These are included in the adjustment completion confirmation functions executed by the CPU 5.

The CPU 5 can recognize that the calibration was completed without the above-described logical equation (23) giving "yes". More particularly, the CPU 5 can execute an automatic adjustment result determining function of determining that the result of automatic adjustment is insufficient, when the difference between the actual coordinate and the confirmation coordinate obtained with using the temporary camera adjustment value at the time of completion of the automatic adjustment by the adjusting section 30 exceeds a predetermined fixation threshold value. Therefore, based on this determination result, the display controlling section 201 can effectively control the display modes of the confirmation marker (marker frame H or cross-shaped marker J) and the region marker (ROI frame F).

In such case as above, the display controlling section 201 will cause the touch panel 4b to display an arrow-shaped button as shown in FIG. 20. Then, the worker will operate this arrow-shaped button in the touch panel 4b and proceed to effect readjustment of the camera 1 manually. In other words, the CPU 5 executes a manual adjustment function. The confirmation coordinate of the center of the marker frame H corresponds to the position of the calibration point on the last corrected straight line $L_{ans}$ in the automatic adjustment. Therefore, as indicated with an imaginary line in FIG. 20, the corrected straight line $L_{ans}$ is present in the captured image.

The worker will operate the arrow-shaped button in the touch panel 4b when needed, thereby to adjust the rotation angle or the upper/lower and/or right/left positions of the corrected straight line $L_{ans}$, thus effecting manual calibration for placing the marker 80 within the marker frame H. In this manual adjustment, the corrected straight line $L_{ans}$ is illustrated as an imaginary line which is not displayed on the displaying section 4a, but if the line is displayed, improvement in the work efficiency can be expected. The CPU 5 (manual adjusting section 60), like Patent Document 1 and Patent Document 2, corrects the camera adjustment values calculated as described above, in accordance with an operational amount of the touch button displayed on the touch panel 4b. The camera adjustment value corrected by the manual adjustment is the temporary camera adjustment value (undetermined camera adjustment value) temporarily stored in a work area of the CPU 5.

In the instant embodiment, as the confirmation marker, the marker frame H is employed. As described above, from the ergonomic point of view, it is said that positioning a target within a frame is easier than matching a point with another point. Therefore, in effecting such manual adjustment also, using the marker frame H permits achievement of higher work efficiency. In the instant embodiment, the marker frame H (confirmation marker) is provided as a frame sized to include the marker 80 with a predetermined margin in the captured image, while the confirmation coordinate which is a position of the theoretical coordinate of the calibration point is taken as a center. As also described hereinbefore, the marker 80 has a rectangular shape and the marker frame H too is rectangular. Therefore, in both the adjustment completion confirming step and the readjusting step (manual adjusting step), comparison can be made effectively and easily between the outer shape of the marker 80 and the outer frame displayed as the marker frame H.

<Camera Adjustment Value Setting Step>

Finding the marker 80 being confined within the marker frame H, the worker will operate the completion button on the touch panel 4b. Operations to the touch panel 4b are transmitted via the instruction input receiving section 202 of the HMI controlling section 20 to the adjusting section 30 and/or the manual adjusting section 60 and/or the camera adjustment value setting section 19. And, the temporary camera adjustment value (undetermined camera adjustment value) after the completion of the manual adjustment is written into the parameter memory 7 and fixed as the camera adjustment value, thus completing all the processing of the calibration device 10. And, the displaying section 4a of the monitor device 4 will display a map screen of the navigation system, like the one shown in FIG. 7.

<Special Cases of Adjustment Completion Confirming Step and Camera Adjustment Value Setting Step>

Incidentally, in the above-described adjustment completion confirming step, even when the difference between the confirmation coordinate and the actual coordinate is below the predetermined fixation threshold value, the display controlling section 201 can sometimes change the display mode of the confirmation marker (marker frame H or the cross-shaped marker J) or the region frame (ROI frame F). Namely, regardless of the result of the decision based on the fixation threshold value, the display controlling section 201 changes the display mode of the confirmation marker or the region frame, if the rotation parameter in the case of the camera 1 mounted at the designed position in the designed posture has a same value as the rotation parameter adjusted using the temporary camera adjustment value at the time of completion of repeated calculations by the adjusting section 30. Alternatively, the display controlling section 201 changes the display mode of the confirmation marker or the region frame, if all of the camera adjustment values ($\Delta$roll, $\Delta$pan, $\Delta$tilt) are the initial values, i.e., zero.

In this case, the display mode of the confirmation marker or the region frame may be changed, regardless of the result of decision based on the fixation threshold value, if any one of the roll, pan and tilt components contained in the rotation parameter has the same value. Needless to say, if at least one of the camera adjustment values ($\Delta$roll, $\Delta$pan, $\Delta$tilt) is zero, the confirmation marker or the region frame may be displayed in a different display mode.

Errors in the rotation parameter will show normal distribution like natural phenomena in general. However, the median value thereof is different from that of the ideal rotation parameter. Namely, a point where the camera adjustment values ($\Delta$roll, $\Delta$pan, $\Delta$tilt) becomes zero does not show the median value of the normal distribution. As the possibility of all parts that may cause errors in the rotation parameter become an ideal designed values is extremely low, the possibility of the median value of the normal distribution being the ideal rotation parameter is rare. Further, it may be reasoned that the most frequently produced posture in the production when this camera 1 is mounted on the vehicle 90 is not the posture corresponding to the ideal rotation parameter R. Therefore, it may be also said that the chance of all of the camera adjustment values ($\Delta$roll, $\Delta$pan, $\Delta$tilt) becoming zero and the value as the ideal rotation parameter being same as the rotation parameter adjusted with using the temporary camera adjustment value is rare.

In such a case, the camera adjustment values ($\Delta$roll, $\Delta$pan, $\Delta$tilt) may remain unchanged from the initial values due to failure of appropriate implementation of calculation by the CPU 5. Therefore, in such case, like the readjusting step, it is preferable that the display controlling section 201 will change the display mode of the confirmation marker (marker frame H or the cross-shaped marker J) or the region frame (ROI frame F), in order to facilitate the worker's visual confirmation on the screen and caution the worker.

Further, it is preferable that the camera adjustment value setting section 19 will record in its work log the fact that the camera adjustment value (Δroll, Δpan, Δtilt) was written in the parameter memory 7 under such condition as above. For instance, the record will be transmitted via the CAN 50 to a production management computer, etc. Or, the record will be stored in e.g. a diagnosis memory or the like provided in the parking assistance ECU 9. That is, the fact that the parameter memory 7 is not un-calibrated to remain under the initial condition, but has been rewritten the same value as the initial value as the result of calibration is kept in record. With this, when a displacement of the camera 1 relative to the desired posture is found later, it is possible to track or determine whether this displacement occurred post-production or due to production defect.

Other Embodiments (1) In the foregoing embodiment, the calibration device 10 is activated when a worker operates the system setting button 4h of the monitor device 4 to cause the displaying section 4a to display the setting screen and then operates a predetermined touch button on the touch panel 4b. Further, in the foregoing embodiment, the calibration device 10 basically effects automatic adjustment and in the confirming step, if necessary, the worker effects manual adjustment. However, the system may differ for each production or repair factory and the automatic adjustment may not always be possible in all production/repair factories. Then, preferably, as shown in FIG. 22, an arrangement may be provided such that at the time of activation (start) of the calibration device 10, selection between automatic adjustment and manual adjustment is made possible.

As described above, at a production/repair factory, a worker operates the system setting button 4h shown in FIG. 7 to cause the displaying section 4a to display the setting screen. In this displaying section 4a, as shown in the upper section in FIG. 22, there is shown a geographical map together with the present position of the vehicle 90. Then, there will be displayed a setting screen (first setting screen) as shown in the intermediate section in FIG. 22. Then, if the worker selects a "camera adjustment" button in the touch panel 4b, the instruction input receiving section 202 of the HMI controlling section 20 receives this touch button instruction and the CPU 5 activates the camera calibration program. To this point, this further embodiment is same as the foregoing embodiment and the above-described automatic adjustment calculations are effected in this further embodiment as well.

In this further embodiment, as shown in the lower section in FIG. 22, a selection screen is further displayed. And, at this stage, if the worker selects the "automatic adjustment" button in the touch panel 4b, the instruction input receiving section 202 of the HMI controlling section 20 receives this touch button instruction and the CPU 5 activates an automatic adjustment program. This automatic adjustment program is same as the camera calibration program described in the foregoing embodiment. In the selection screen, if the worker selects a "manual adjustment" button in the touch panel 4b, the instruction input receiving section 202 of the HMI controlling section 20 receives this touch button instruction and the CPU 5 activates the manual adjustment program. In response to this selection of manual adjustment, the camera calibration program which executes manual adjustment calculations similar to those in Patent Document 1 and Patent Document 2 is activated.

(2) In the foregoing embodiment, there was described the case of calibrating the camera 1 configured to capture an image rearwardly of the vehicle 90. The calibration device of the invention may be used also for calibration of a camera configured to capture an image forwardly or laterally of the vehicle 90.

(3) In the embodiment described above, the explanation was made while taking as an example a case where the first adjusting section is the rotation adjusting section 14 and the second adjusting section is the position adjusting section 15. However, the present invention is not limited to this case, and depending on the structure of the camera to be calibrated and a method for mounting the camera, the first adjusting section may be the position adjusting section 15, and the second adjusting section may be the rotation adjusting section 14.

(4) When any one of the pan rotation or the tilt rotation described above in the tolerance control of the mounting precision of the camera 1 is manageable with high precision, the position adjusting section 15 may be comprised of any one of the horizontal position adjusting section 16 or the vertical position adjusting section 17 alone. The same applies to the position adjusting step (#20) and to the position adjusting function.

(5) The setting of the region of interest ROI and the superposing of this ROI frame F in the displaying section 4a are possible, regardless of the camera calibration method. These are possible, not only in the case of manual adjustment, but also in the case of effecting the camera calibration by a calculation technique different from the one described in the foregoing embodiment, for example with using the algorithm described in Patent Document 3. Further, the use of the rectangular marker frame H as the confirmation marker is possible, regardless of the camera calibration method. Namely, this is possible, not only in the case of manual adjustment, but also in the case of effecting the camera calibration by a calculation technique different from the one described in the foregoing embodiment, for example with using the algorithm described in Patent Document 3.

As described above, according to the present invention, it has been made possible to provide an on-board camera calibration device with high productivity, which device allows speedy calibration of the on-board camera with high precision with a simple construction.

REFERENCE SIGNS LIST

1: Camera (on-board camera)
10: Calibration device
11: Image acquiring section
12: Calibration point specifying section
13: Coordinate conversion section
14: Rotation adjusting section, roll adjusting section (first adjusting section)
15: Position adjusting section (second adjusting section)
16: Horizontal position adjusting section (pan adjusting section)
17: Vertical position adjusting section (tilt adjusting section)
18: Adjustment completion determining section
19: Camera adjustment value setting section
80: Marker (calibration index)
90: Vehicle
pan_out: Difference value of pan rotation
pan_th: Pan adjustment threshold value (completion threshold value)
roll_out: Difference value of roll rotation
roll_th: Roll adjustment threshold value (completion threshold value)

tilt_out: difference value of tilt rotation
tilt_th: Tilt adjustment threshold value (completion threshold value)
$L_{tgt}$: Real line, first real line
$L_{cnv}$: Converted straight line, first converted straight line
$L_{tgt2}$: Second real line
$L_{cnv2}$: Second converted straight line
Oc: Origin of camera coordinate
Pc: Midpoint of converted straight line
Q, Q1, Q2, P, P1, P2, $P1_{int}$, $P2_{int}$: Calibration point
Qc: Midpoint of real line
Π: Projecting plane
Δroll: Roll adjustment value, rotation adjustment value, camera adjustment value
Δpan: Pan adjustment value, horizontal position adjustment value, position adjustment value, camera adjustment value
Δtilt: Tilt adjustment value, vertical position adjustment value, position adjustment value, camera adjustment value
$(x_{cnv}, y_{cnv})$: Coordinate of midpoint of converted straight line
$(x_{tgt}, y_{tgt})$: Coordinate of midpoint of real line
$(x_{ans}, y_{ans})$: Coordinate of midpoint of corrected straight line

The invention claimed is:

1. A calibration device for an on-board camera for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for calibrating the on-board camera, the device comprising:

an image acquiring section for acquiring a captured image captured by the on-board camera with including, within a field of view, calibration points disposed at respective two different predetermined positions in the reference coordinate system;

a calibration point specifying section for detecting each calibration in the captured image which is a projecting plane of the camera coordinate system and for specifying as an actual coordinate a coordinate of the calibration point in a two-dimensional orthogonal coordinate system set in the projecting plane;

a coordinate conversion section for converting an initial coordinate that specifies each calibration point in the projecting plane into a converted coordinate with using unfixed camera adjustment values for correcting the camera parameters in accordance with the actual mounting posture of the on-board camera, based on camera parameters defining the relationship between the camera coordinate system and the reference coordinate system when the on-board camera is mounted at the designed position in the designed posture;

a first adjusting section for calculating one or two adjustment values of three adjustment values constituting the camera adjustment values which are displacement amounts from the designed posture corresponding to rotation angles about one or two axes from among three axes of the camera coordinate system, based on the converted coordinate and the actual coordinate, and for updating the camera adjustment values;

a second adjusting section for calculating the other two or one adjustment values of the three adjustment values excluding the one or two adjustment values calculated in the first adjusting section from among the adjustment values constituting the camera adjustment values which are displacement amounts from the designed posture corresponding to rotation angles about remaining two or one axes excluding the axes on which the calculation is effected in the first adjusting section from among three axes of the camera coordinate system, based on the actual coordinate and a converted coordinate which has been coordinate-converted by the coordinate conversion section with using the camera adjustment values updated by the first adjusting section, and for updating the camera adjustment values;

an adjustment completion determining section for determining completion of an adjustment of the camera adjustment values based on displacement amounts between the converted coordinate and the actual coordinate during the adjustment by the first adjusting section and the second adjusting section; and a camera adjustment value setting section for fixing the camera adjustment values updated with using the adjustment values calculated in the first adjusting section and the second adjusting section, based on a determination result of the completion of the adjustment by the adjustment completion determining section;

wherein the adjustment completion determining section determines that the adjustment of the camera adjustment values has been completed when displacement amounts between the converted coordinate and the actual coordinate during the adjustment by the first adjusting section and the second adjusting section are less than respective predetermined reference displacement amounts.

2. The calibration device for an on-board camera according to claim 1, wherein
the image acquiring section acquires the captured image captured by the on-board camera with including, within a field of view, calibration indices disposed at respective two different predetermined positions in the reference coordinate system, and
the calibration point specifying section detects the calibration point in each of the calibration indices in the captured image which is the projecting plane of the camera coordinate system and for specifying as an actual coordinate the coordinate of the calibration point in the two-dimensional orthogonal coordinate system set in the projecting plane.

3. A calibration method for an on-board camera for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for calibrating the on-board camera, the method comprising:

acquiring a captured image captured by the on-board camera with including, within a field of view, calibration points disposed at respective two different predetermined positions in the reference coordinate system;

detecting each calibration point in the captured image which is a projecting plane of the camera coordinate system and for specifying as an actual coordinate a coordinate of the calibration point in a two-dimensional orthogonal coordinate system set in the projecting plane;

converting an initial coordinate that specifies each calibration point in the projecting plane into a first converted coordinate with using unfixed camera adjustment values for correcting the camera parameters in accordance with the actual mounting posture of the on-board camera, based on camera parameters defining the relationship between the camera coordinate system and the reference coordinate system when the on-board camera is mounted at the designed position in the designed posture;

calculating in a first adjusting step one or two adjustment values of three adjustment values constituting the camera adjustment values which are displacement amounts from the designed posture corresponding to rotation angles about one or two axes from among three axes of the camera coordinate system, based on the first converted coordinate and the actual coordinate, and for updating the camera adjustment values;

converting the initial coordinate into a second converted coordinate with using the camera adjustment values which are updated in the first adjusting step and are yet unfixed;

calculating in a second adjusting step the other two or one adjustment values of the three adjustment values excluding the one or two adjustment values calculated in the first adjusting step from among the adjustment values constituting the camera adjustment values which are displacement amounts from the designed posture corresponding to rotation angles about remaining two or one axes excluding the axes adjusted in the first adjusting step from among three axes of the camera coordinate system, based on the second converted coordinate and the actual coordinate, and for updating the camera adjustment values;

determining completion of an adjustment of the camera adjustment values based on displacement amounts between the first converted coordinate and the actual coordinate and displacement amounts between the second converted coordinate and the actual coordinate in the first adjusting step and the second adjusting step; and fixing the camera adjustment values updated with using the adjustment values calculated in the first adjusting step and the second adjusting step, to which a process is advanced when the adjustment is completed;

wherein the adjustment completion determining includes determining that the adjustment of the camera adjustment values has been completed when displacement amounts between the converted coordinate and the actual coordinate during the adjustment by the first adjusting section and the second adjusting section are less than respective predetermined reference displacement amounts.

4. A calibration program for an on-board camera for defining in accordance with an actual mounting posture of the on-board camera a relationship between a three-dimensional orthogonal camera coordinate system of the on-board camera mounted on a vehicle at a designed position in a designed posture in a three-dimensional orthogonal reference coordinate system and the reference coordinate system and for causing a computer to execute a function of calibrating the on-board camera, the calibration program comprising:

an image acquiring function of acquiring a captured image captured by the on-board camera with including, within a field of view, calibration points disposed at respective two different predetermined positions in the reference coordinate system;

a calibration point specifying function of detecting each calibration point in the captured image which is a projecting plane of the camera coordinate system and of specifying as an actual coordinate a coordinate of the calibration point in a two-dimensional orthogonal coordinate system set in the projecting plane;

a first coordinate conversion function of converting an initial coordinate that specifies each calibration point in the projecting plane into a first converted coordinate with using unfixed camera adjustment values for correcting the camera parameters in accordance with the actual mounting posture of the on-board camera, based on camera parameters defining the relationship between the camera coordinate system and the reference coordinate system when the on-board camera is mounted at the designed position in the designed posture;

a first adjusting function of calculating one or two adjustment values of three adjustment values constituting the camera adjustment values which are displacement amounts from the designed posture corresponding to rotation angles about one or two axes from among three axes of the camera coordinate system, based on the first converted coordinate and the actual coordinate, and of updating the camera adjustment values;

a second coordinate conversion function of converting the initial coordinate to a second converted coordinate with using the camera adjustment values which are updated by execution of the first adjusting function and are yet unfixed;

a second adjusting function of calculating the other two or one adjustment values of the three adjustment values excluding the one or two adjustment values calculated by the execution of the first adjusting function from among the adjustment values constituting the camera adjustment values which are displacement amounts from the designed posture corresponding to rotation angles about remaining two or one axes excluding the axes adjusted by the execution of the first adjusting function from among three axes of the camera coordinate system, based on the second converted coordinate and the actual coordinate, and of updating the camera adjustment values;

an adjustment completion determining function of determining completion of an adjustment of the camera adjustment values based on displacement amounts between the first converted coordinate and the actual coordinate and displacement amounts between the second converted coordinate and the actual coordinate when the first adjusting function and the second adjusting function are executed; and a camera adjustment value setting function of fixing the camera adjustment values updated with using the adjustment values calculated by the execution of the first adjusting function and the second adjusting function, which camera adjustment value setting function is executed when the adjustment is completed after the execution of the adjustment completion determining function;

wherein the adjustment completion determining includes determining that the adjustment of the camera adjustment values has been completed when displacement amounts between the converted coordinate and the actual coordinate during the adjustment by the first adjusting section and the second adjusting section are less than respective predetermined reference displacement amounts.

* * * * *